United States Patent
Ryu et al.

(10) Patent No.: US 11,770,835 B2
(45) Date of Patent: Sep. 26, 2023

(54) SIDELINK AND UPLINK PRIORITIZED CANCELLATION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Ling Ding, Chester, NJ (US); Jelena Damnjanovic, Del Mar, CA (US); Juan Montojo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/185,316

(22) Filed: Feb. 25, 2021

(65) Prior Publication Data
US 2021/0274543 A1 Sep. 2, 2021

Related U.S. Application Data

(60) Provisional application No. 62/983,484, filed on Feb. 28, 2020.

(51) Int. Cl.
*H04W 72/23* (2023.01)
*H04W 72/56* (2023.01)

(52) U.S. Cl.
CPC .......... *H04W 72/23* (2023.01); *H04W 72/56* (2023.01)

(58) Field of Classification Search
None
See application file for complete search history.

(56) References Cited

U.S. PATENT DOCUMENTS

2003/0123393 A1\* 7/2003 Feuerstraeter .......... H04L 47/10
370/235
2012/0320919 A1\* 12/2012 Baliga ................... H04L 47/828
370/392

(Continued)

FOREIGN PATENT DOCUMENTS

WO WO-2021093124 A1 5/2021

OTHER PUBLICATIONS

International Search Report and Written Opinion—PCT/US2021/020073—ISA/EPO—Jun. 9, 2021.

(Continued)

*Primary Examiner* — Hong S Cho
(74) *Attorney, Agent, or Firm* — Danai Nelisile Mhembere; Holland & Hart LLP

(57) ABSTRACT

Methods, systems, and devices for wireless communications are described. A base station may transmit a configured grant that indicates time-frequency resources for a user equipment (UE) to use to transmit sidelink or uplink messages in a wireless communications system. To reduce the amount of low priority traffic that may interfere with higher priority traffic, the base station may configure a threshold probability to allow high priority sidelink transmissions and to cancel low priority transmissions. The base station may transmit a cancellation indication that includes a priority indication instructing the UE to cancel transmissions having a priority less than a priority threshold during the allocated time-frequency resources. Based on transmitting the cancellation indication, the base station may cancel transmissions that have low priority, and the UE may determine whether to transmit (or to refrain from transmitting) one or more messages based on the priority of the message.

25 Claims, 21 Drawing Sheets

(56) References Cited

U.S. PATENT DOCUMENTS

2014/0185495 A1\* 7/2014 Kuchibhotla ......... H04W 76/14
　　　　　　　　　　　　　　　　　　　　　　370/329
2019/0394786 A1 12/2019 Parron et al.
2021/0219276 A1\* 7/2021 Liu ..................... H04W 72/042

OTHER PUBLICATIONS

VIVO: "Summary#4 of UL Inter UE Tx Prioritization/Multiplexing", 3GPP Draft, R1-1911712, 3GPP TSG RAN WG1 #98bis, Summary #3 of UL InterUE TX PrioritizationMultiplexing_V4, 3rd Generation Partnership Project (3GPP), Mobile Competence Centre, 650, Route Des Lucioles, F-06921 Sophia-Antipoli vol. RAN WG1, No. Chongqing, China, Oct. 14, 2019-Oct. 20, 2019, Oct. 22, 2019 (Oct. 22, 2019), XP051798954, 39 Pages, Retrieved from the Internet: URL:https://ftp.3gpp.org/tsg_ran/WG1_RL1/TSGR1_98b/Docs/R1-1911712.zip R1-1911712 Summary#3 of UL interUE Tx prioritizationmultiplexing_v4.docx [retrieved on Oct. 22, 2019] the whole document.

\* cited by examiner

SIDELINK AND UPLINK PRIORITIZED CANCELLATION

CROSS REFERENCE

The present application for patent claims the benefit of U.S. Provisional Patent Application No. 62/983,484 by RYU et al., entitled "SIDELINK AND UPLINK PRIORITIZED CANCELLATION," filed Feb. 28, 2020, assigned to the assignee hereof, and expressly incorporated by reference herein.

FIELD OF TECHNOLOGY

The following relates generally to wireless communications and more specifically to sidelink and uplink prioritized cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread OFDM (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may send messages that have different reliability and latency targets. For example, a device may be configured to send data transmissions which may correspond to lower priority data, and ultra-reliable low-latency (URLLC) transmissions, which may correspond to higher priority data. Some techniques utilized by a wireless device, however, may not consider different priorities when performing communications.

SUMMARY

The described techniques relate to improved methods, systems, devices, and apparatuses that support sidelink and uplink prioritized cancellation. Generally, the described techniques provide for reducing interference from low priority uplink or sidelink messages during transmission of high priority data.

Some wireless communications systems may be configured to support different kinds of signaling traffic for uplink and sidelink communications. For example, devices such as user equipment (UE) and base stations may support both normal data traffic (e.g., data traffic communicated in accordance with a first latency and reliability target) and ultra-reliable low-latency traffic (URLLC), which may be associated with a second latency and reliability target. Different signaling traffic may be associated with different priorities, including different latency and reliability targets.

In some examples, the base station may transmit a grant (e.g., a configured grant, a periodic grant) that indicates time-frequency resources allocated for a UE to use for transmitting sidelink or uplink messages. To reduce the amount of low priority traffic that may interfere with higher priority traffic, the base station may configure a threshold to allow high priority sidelink transmissions (e.g., transmissions that satisfy a threshold priority) and to cancel low priority transmissions. For example, the base station may transmit a cancellation indication including a priority indication that instructs the UE to cancel transmissions having a priority less than the priority threshold using the allocated time-frequency resources. Based on transmitting the cancellation indication, the base station may cancel transmissions that have low priority, and the UE may determine whether to transmit (or refrain from transmitting) one or more messages based on the priority of the one or more messages.

A method of wireless communications at a UE is described. The method may include receiving, from a base station, a grant for the UE that indicates a set of time-frequency resources configured for sidelink or uplink communications for the UE, receiving, from the base station, an indication instructing the UE to cancel transmissions having a priority less than a priority threshold during at least a portion of the set of time-frequency resources, and determining whether to transmit one or more messages via at least the portion of the set of time-frequency resources based on the indication.

An apparatus for wireless communications at a UE is described. The apparatus may include a processor, memory coupled with the processor, and instructions stored in the memory. The instructions may be executable by the processor to cause the apparatus to receive, from a base station, a grant for the UE that indicates a set of time-frequency resources configured for sidelink or uplink communications for the UE, receive, from the base station, an indication instructing the UE to cancel transmissions having a priority less than a priority threshold during at least a portion of the set of time-frequency resources, and determine whether to transmit one or more messages via at least the portion of the set of time-frequency resources based on the indication.

Another apparatus for wireless communications at a UE is described. The apparatus may include means for receiving, from a base station, a grant for the UE that indicates a set of time-frequency resources configured for sidelink or uplink communications for the UE, receiving, from the base station, an indication instructing the UE to cancel transmissions having a priority less than a priority threshold during at least a portion of the set of time-frequency resources, and determining whether to transmit one or more messages via at least the portion of the set of time-frequency resources based on the indication.

A non-transitory computer-readable medium storing code for wireless communications at a UE is described. The code may include instructions executable by a processor to receive, from a base station, a grant for the UE that indicates a set of time-frequency resources configured for sidelink or uplink communications for the UE, receive, from the base station, an indication instructing the UE to cancel transmissions having a priority less than a priority threshold during at least a portion of the set of time-frequency resources, and determine whether to transmit one or more messages via at least the portion of the set of time-frequency resources based on the indication.

Some examples of the method, apparatuses, and non-transitory computer-readable medium described herein may further include operations, features, means, or instructions for determining to refrain from transmitting the one or more messages based on the one or more messages having a second priority less than the priority threshold.

Some examples of the method, apparatuses, and non-transitory computer-readable medium described herein may further include operations, features, means, or instructions for transmitting, based on determining to refrain from transmitting, a preemption indication to a second UE indicating cancellation of transmission of the one or more messages from the UE.

Some examples of the method, apparatuses, and non-transitory computer-readable medium described herein may further include operations, features, means, or instructions for transmitting, to a second UE, an indication of the priority threshold indicating that transmissions having priorities less than the priority threshold may be canceled.

In some examples of the method, apparatuses, and non-transitory computer-readable medium described herein, the indication of the priority threshold may be included in a preemption indication.

Some examples of the method, apparatuses, and non-transitory computer-readable medium described herein may further include operations, features, means, or instructions for identifying additional resources scheduled for an uplink message from the UE, where the additional resources at least partially overlap the set of time-frequency resources indicated by the grant, and refraining from transmitting the uplink message based on the indication and the uplink message having the second priority.

Some examples of the method, apparatuses, and non-transitory computer-readable medium described herein may further include operations, features, means, or instructions for determining to transmit the one or more messages based on the one or more messages having a second priority greater than the priority threshold.

In some examples of the method, apparatuses, and non-transitory computer-readable medium described herein, the one or more messages may be sidelink messages or uplink messages.

In some examples of the method, apparatuses, and non-transitory computer-readable medium described herein, the set of time-frequency resources of the grant may be periodic.

A method of wireless communications at a base station is described. The method may include transmitting a grant to a UE that indicates a set of time-frequency resources configured for sidelink or uplink communications for the UE, determining a priority of a message for transmission via a portion of the set of time-frequency resources, the message being one of an uplink or a sidelink, and transmitting an indication instructing the UE to cancel transmissions having a second priority less than a priority threshold during the portion of the set of time-frequency resources based on the priority of the message.

An apparatus for wireless communications at a base station is described. The apparatus may include a processor, memory coupled with the processor, and instructions stored in the memory. The instructions may be executable by the processor to cause the apparatus to transmit a grant to a UE that indicates a set of time-frequency resources configured for sidelink or uplink communications for the UE, determine a priority of a message for transmission via a portion of the set of time-frequency resources, the message being one of an uplink or a sidelink, and transmit an indication instructing the UE to cancel transmissions having a second priority less than a priority threshold during the portion of the set of time-frequency resources based on the priority of the message.

Another apparatus for wireless communications at a base station is described. The apparatus may include means for transmitting a grant to a UE that indicates a set of time-frequency resources configured for sidelink or uplink communications for the UE, determining a priority of a message for transmission via a portion of the set of time-frequency resources, the message being one of an uplink or a sidelink, and transmitting an indication instructing the UE to cancel transmissions having a second priority less than a priority threshold during the portion of the set of time-frequency resources based on the priority of the message.

A non-transitory computer-readable medium storing code for wireless communications at a base station is described. The code may include instructions executable by a processor to transmit a grant to a UE that indicates a set of time-frequency resources configured for sidelink or uplink communications for the UE, determine a priority of a message for transmission via a portion of the set of time-frequency resources, the message being one of an uplink or a sidelink, and transmit an indication instructing the UE to cancel transmissions having a second priority less than a priority threshold during the portion of the set of time-frequency resources based on the priority of the message.

Some examples of the method, apparatuses, and non-transitory computer-readable medium described herein may further include operations, features, means, or instructions for identifying transmission of an uplink message by a second UE via the portion of the set of time-frequency resources, determining the priority threshold based on the uplink message, and transmitting, based on the uplink message, the indication to one or more UEs of a group of UEs for cancellation of sidelink transmissions having the second priority.

In some examples of the method, apparatuses, and non-transitory computer-readable medium described herein, identifying the transmission of the uplink message may include operations, features, means, or instructions for receiving a scheduling request for transmission of the uplink message from the second UE.

In some examples of the method, apparatuses, and non-transitory computer-readable medium described herein, the priority threshold corresponds to a priority value of the uplink message.

Some examples of the method, apparatuses, and non-transitory computer-readable medium described herein may further include operations, features, means, or instructions for identifying transmission of a sidelink message by a second UE via the portion of the set of time-frequency resources, determining the priority threshold based on the sidelink message, where the priority threshold corresponds to the sidelink message, and transmitting the indication to one or more UEs of a group of UEs based on the sidelink message, the cancellation indication including the priority threshold.

Some examples of the method, apparatuses, and non-transitory computer-readable medium described herein may further include operations, features, means, or instructions for receiving a scheduling request for transmission of the sidelink message from the second UE to a third UE of the group of UEs.

In some examples of the method, apparatuses, and non-transitory computer-readable medium described herein, the priority threshold corresponds to a priority value of the sidelink message.

In some examples of the method, apparatuses, and non-transitory computer-readable medium described herein, the cancellation indication includes the priority threshold.

In some examples of the method, apparatuses, and non-transitory computer-readable medium described herein, the cancellation indication includes an indication of the portion of the set of time-frequency resources.

In some examples of the method, apparatuses, and non-transitory computer-readable medium described herein, the set of time-frequency resources of the grant may be periodic.

DETAILED DESCRIPTION

Figure 1:
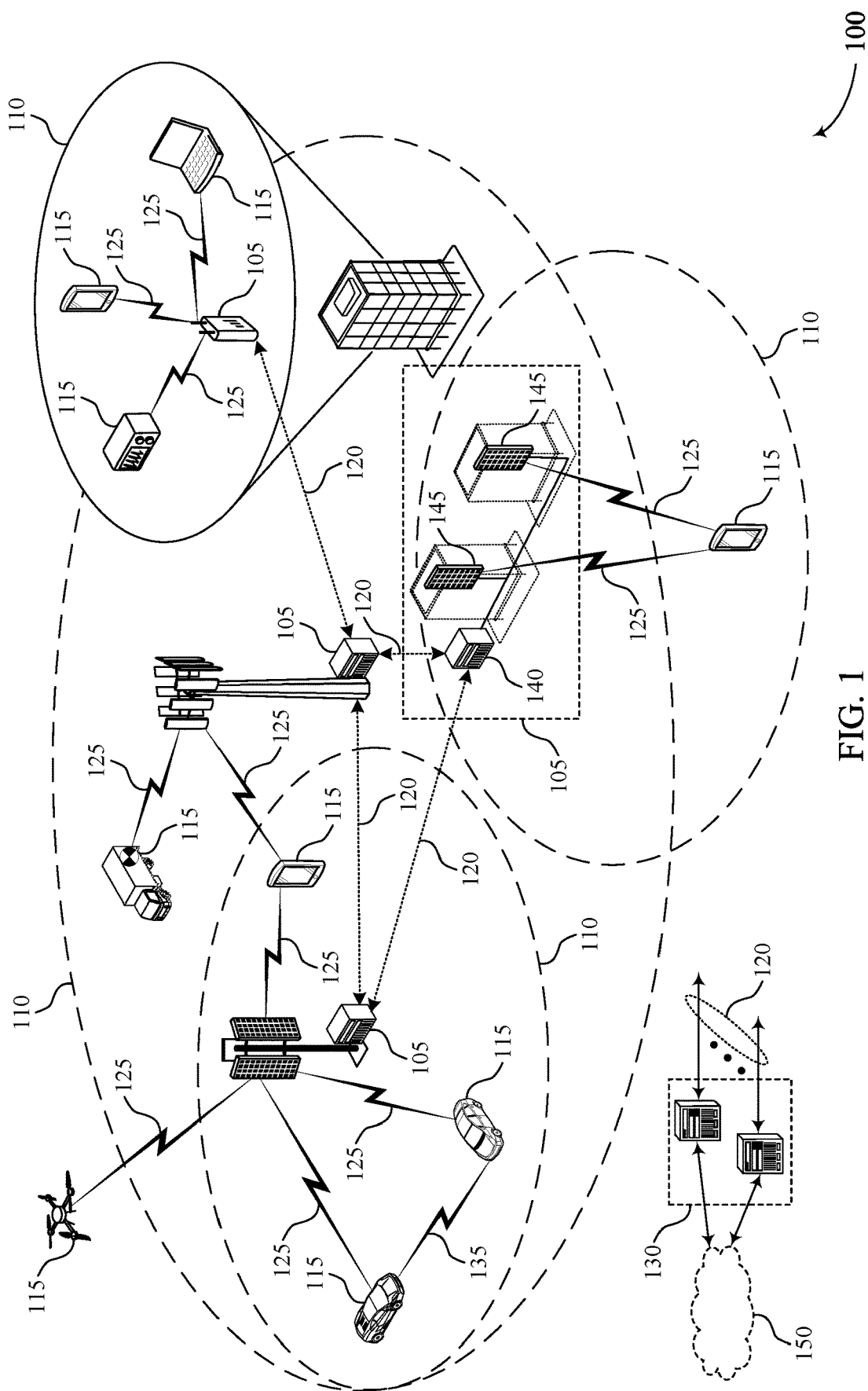
FIGS. 1 through 5 illustrate example wireless communications systems that support aspects of the present disclosure.

Some wireless communications systems may be configured to support different kinds of signaling traffic for uplink and sidelink communications, for example, both normal data traffic (e.g., data traffic associated with first reliability and latency targets) and ultra-reliable low-latency traffic (URLLC), which may be associated with second reliability and latency targets. In some cases, the different priorities may be associated with different traffic types. For example, normal data traffic may be associated with low priority transmissions, and URLLC traffic may be associated with higher priority transmissions (e.g., transmissions with a higher priority or lower latency targets than transmissions associated with normal data transmissions). In some cases, a device such as a base station or a user equipment (UE) may receive an indication to transmit high priority URLLC data, and may transmit the high priority data within a time period that satisfies a low latency target for URLLC traffic.

In some cases, a base station may identify downlink URLLC data to transmit to a UE or group of UEs, and the base station may refrain from transmitting lower priority traffic (e.g., normal downlink data transmissions such as enhanced mobile broadband (eMBB) transmissions) to prioritize transmitting the URLLC data. In some cases, however, the URLLC transmission may disrupt scheduling that the base station had previously established for normal data traffic. In such cases, the base station may notify the UEs of the disruption in scheduling that may occur from accommodating the URLLC transmission.

In one example, the base station may use a preemption indication that notifies the UE that a scheduled resource is being used for a transmission of higher priority traffic. The preemption indication may notify a single UE or a group of UEs to ignore scheduled resources because higher priority traffic is scheduled using the resources. In such cases, the UE may refrain from decoding transmissions in the scheduled downlink resource.

In another example, the base station may transmit a cancellation indication to a UE or a group of UEs to cancel a scheduled uplink or sidelink transmission scheduled using the time-frequency resources. For example, the base station may schedule a first UE to transmit uplink or sidelink data (e.g., normal data) in a set of time-frequency resources, but may determine that a second UE has uplink or sidelink data of a higher priority (e.g., URLLC data) to transmit, and the base station may schedule the second UE using the same set of time-frequency resources. The base station may schedule the second UE to transmit URLLC data via the set of time-frequency resources, and may cancel the normal data transmission of the first UE by sending the cancellation indication to the first UE. In some examples, the base station may include a priority indication with the cancellation indication. The priority indication may indicate a priority threshold p, and the cancellation indication may instruct the UE to cancel transmissions having a priority less than the priority threshold. In some cases, a priority of each transmission may be associated with a number of bits, and determining the priority of the transmission may include comparing the number of bits to the priority threshold.

The base station may allocate resources via a configured grant (e.g., a periodic grant) for a number of UEs of the wireless communications network to transmit normal sidelink or uplink messages. To reduce the amount of low priority traffic, the base station may determine to allow high priority sidelink transmissions (e.g., transmissions that satisfy a threshold priority), which may increase the reliability for the high priority transmissions. In some examples, the base station may identify an increase in high priority traffic and may use resources indicated by the configured grant to transmit the higher priority data. In such examples, the base station may transmit the cancellation indication including the priority indication to a UE to notify the UE that a lower priority scheduled transmission is canceled. Based on transmitting the cancellation indication, the base station may cancel transmissions that have low priority, which may reduce the amount of traffic or interference for high priority data, and may increase the likelihood that high priority transmissions are successfully communicated.

In some examples, uplink URLLC traffic may preempt or cancel a scheduled lower priority sidelink transmission and the UE may transmit the uplink URLLC traffic in a resource that the base station had previously scheduled for the lower priority sidelink transmission. In some other examples, high priority sidelink URLLC traffic may preempt or cancel a scheduled uplink transmission, and the UE may transmit the URLLC data in a resource that the base station had previously scheduled for lower priority uplink transmissions. In yet other examples, high priority sidelink URLLC traffic may preempt or cancel another lower priority scheduled sidelink transmission, and the UE may transmit the URLLC data in a resource that the base station had previously scheduled for lower priority sidelink transmissions.

Aspects of the disclosure are initially described in the context of wireless communications systems. For example, aspects of the disclosure are described in the context of communications between wireless devices that support uplink and sidelink communications. Aspects of the disclosure are further illustrated by and described with reference to apparatus diagrams, system diagrams, a process flow diagram, and flowcharts that relate to sidelink and uplink prioritized cancellation.

FIG. 1 illustrates an example of a wireless communications system 100 that supports sidelink and uplink prioritized cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may be configured to support different kinds of signaling traffic for uplink and sidelink communications. For example, devices such as a UE 115 and a base station 105 may support both URLLC normal traffic. Normal traffic may in some cases include uplink and downlink transmissions between a base station 105 and a UE 115 or sidelink transmissions between a group of UEs. In addition, normal traffic may not be associated with a reliability or latency target, or may be associated with lower reliability or latency targets than URLLC data (e.g., URLLC traffic may have higher priority than normal traffic). In some cases, a device such as a base station 105 or a UE 115 may prioritize high priority traffic over lower priority traffic.

In some examples, the base station 105 may transmit a grant for resources such as periodic resources to a UE 115 or a group of UEs, which may be used for sidelink or uplink communications. To improve reliability of the higher priority traffic, the base station 105 may configure a threshold for allowing a portion of traffic, such as high priority sidelink or uplink transmissions (e.g., transmissions that satisfy a threshold priority), to be communicated via a given set of resources. In such examples, the base station 105 may transmit the cancellation indication including the priority indication to UE 115 to instruct the UE 115 to cancel a lower priority scheduled transmission (e.g., based on the lower priority scheduled transmission having a priority less than the priority threshold). Such techniques may reduce the amount of traffic or interference experienced by high priority sidelink transmissions or high priority uplink transmissions.

In some examples, uplink URLLC traffic may preempt or cancel a scheduled lower priority sidelink transmission. In some other examples, high priority sidelink URLLC traffic may preempt or cancel a scheduled uplink transmission. In yet other examples, high priority sidelink URLLC traffic may preempt or cancel another lower priority scheduled sidelink transmission.

Figure 2:
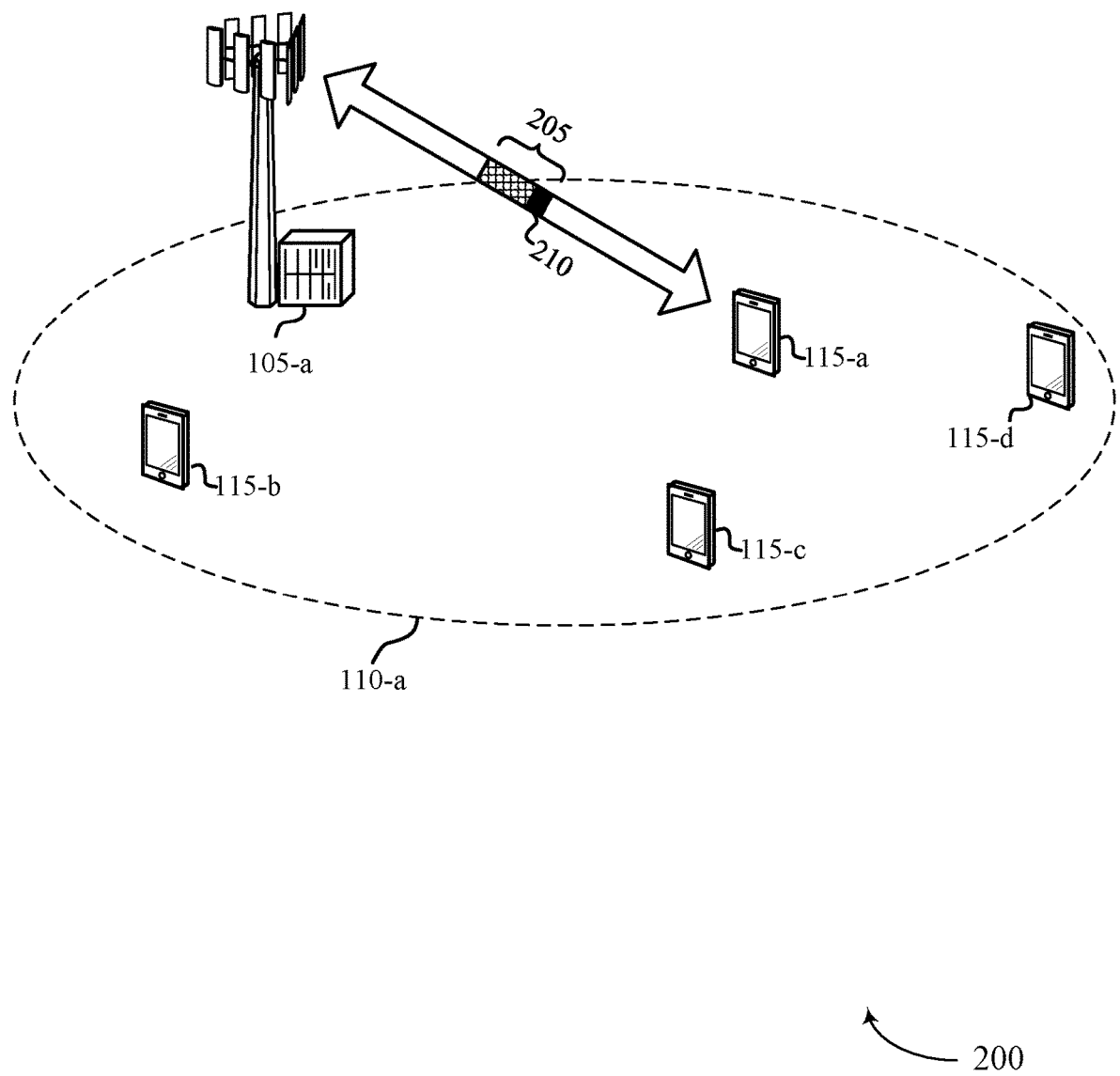

FIG. 2 illustrates an example of a wireless communications system 200 that supports sidelink and uplink prioritized cancellation in accordance with aspects of the present disclosure. In some examples, wireless communications system 200 may implement aspects of wireless communications system 100. For example, wireless communications system 200 may support communications between various UEs 115 (e.g., UE 115-*a*) and abase station 105-*a*, which may be examples of a UE 115 and a base station 105 described with reference to FIG. 1.

Devices in wireless communications system 200 may communicate using various communication links. In some examples, a device such as UE 115-*a* may communicate directly with base station 105-*a* using an access link. In some other cases, UE 115-*a* (or another device such as an IAB node, etc.) may communicate using a sidelink established directly between one or more other devices (e.g., with or without a direct link to a base station 105-*a*). In sidelink communications, a sidelink device such as UE 115-*a* may use beamforming techniques to establish a communication link. In some cases, for example, for in-coverage sidelink operation (e.g., mode 1), sidelink UEs 115 may have a connection with the base station 105-*a*. The base station 105-*a* may indicate resources that the sidelink UEs may use for sidelink communications (e.g., the sidelink UEs 115 may be in an RRC_Connected state with the base station 105-*a*).

Wireless communications system 200 may be configured to support different priorities of traffic, and in some cases different priorities may correspond to different traffic types. For example, eMBB access may correspond to low priority access for downlink and uplink traffic, and URLLC may correspond to higher priority traffic (e.g., traffic with a higher priority or lower latency than traffic associated with eMBB). In some cases, a transmitting device (such as base station 105-*a* for downlink communications, and UE 115-*a* for uplink communications) may identify high priority URLLC data for transmission. In some cases, the transmitting device may transmit the high priority data within a time period that satisfies a low latency target for URLLC traffic. In some examples, data traffic priority may be included in control information such as downlink control information (DCI) for a message containing the data.

In one example, the base station 105-*a* may use a preemption indication that notifies the UE 115-*a* that a resource that was scheduled for communications between the base station 105-*a* and the UE 115-*a* is being used for a transmission of higher priority traffic. In some cases, the base station 105-*a* may transmit a preemption indication using a control message such as DCI (e.g., DCI format 2_1). The preemption indication may notify a single UE 115-*a* or a group of UEs 115 to ignore scheduled resources (physical resource blocks (PRBs), OFDM symbols, etc.) based on higher priority traffic that was scheduled using the resources (e.g., the UE 115-*a* or group of UEs may assume that no transmissions are to be received over the indicated resources). In some cases, the preemption indication may indicate to the UE 115-*a* that the base station 105-*a* was scheduled to transmit downlink eMBB transmissions to the UE 115-*a*, but refrained from doing so in order to prioritize the transmission of urgent URLLC traffic. In such cases, the UE 115-*a* may refrain from decoding transmissions in the scheduled downlink resource.

In another example, the base station 105-*a* may use a cancellation indication 205 to cancel a scheduled uplink or sidelink transmission in a time-frequency resource. For example, base station 105-*a* may schedule a first UE such as UE 115-*a* to transmit uplink data (e.g., eMBB data or a normal data transmission) in a time-frequency resource, but may determine that a second UE 115-*b* in the coverage area 110-*a* has uplink data of a higher priority (e.g., URLLC data) to transmit using the same time-frequency resource. The base station 105-*a* may schedule the second UE 115-*b* to transmit URLLC data using the time-frequency resource, and may cancel the uplink transmission of the first UE 115-*a*. The base station 105-*a* may transmit a cancellation indication to the first UE 115-*a* to notify the first UE 115-*a* that the uplink transmission is canceled. In some examples, the base station 105-*a* may include a priority indication 210 with the cancellation indication. The priority indication 210 may indicate a priority threshold "p" to indicate that transmissions with priority less than a priority threshold p in the time-frequency resource are to be canceled.

Wireless communications system 200 may support sidelink communications for data having different priorities, for example, devices may transmit both normal data (e.g., lower priority transmissions relative to URLLC data) and URLLC data over a sidelink connection. In some cases, the base station 105-*a* may allocate resources for sidelink communications. For example, in duplex communications (e.g., time division duplexing (TDD)) uplink slots may be scheduled by the base station 105-*a* for uplink transmissions from UEs 115 to the base station 105-*a*. In addition, the base station 105-*a* may schedule sidelink transmissions between devices (e.g., from UE 115-*a* to another UE 115-*b*, 115-*c*, or 115-*d* for mode 1 operation).

In some examples, uplink URLLC traffic may preempt a scheduled lower priority sidelink transmission such that UE 115-*a* may transmit uplink URLLC data after receiving the data from a higher layer. To transmit the URLLC data to meet a low latency target, UE 115-*a* may transmit the uplink URLLC traffic in a resource that the base station 105-*a* had previously scheduled for the lower priority sidelink.

In some other examples, high priority sidelink URLLC traffic may preempt a scheduled uplink transmission such that UE 115-*a* may transmit sidelink URLLC traffic after receiving the traffic from a higher layer. UE 115-*a* may transmit the URLLC data in a resource that the base station had previously scheduled for lower priority uplink transmissions.

In some other examples, high priority sidelink URLLC traffic may preempt another lower priority scheduled sidelink transmission, such that UE 115-*a* may transmit high priority sidelink URLLC traffic after receiving the traffic from a higher layer. UE 115-*a* may transmit the URLLC data in a resource that the base station had previously scheduled for lower priority sidelink transmissions.

In sidelink communications, the priority of the sidelink transmission may be determined using a number of bits in a sidelink control indicator (SCI) or physical sidelink control channel (PSCCH). For example, three bits may be used to indicate a transmission priority (e.g., up to 8 levels of priority). In cases where base station 105-*a* identifies sidelink data to transmit, the base station 105-*a* may configure a threshold for each UE 115 (such as the threshold priority associated with priority indication 210). In some examples, the base station 105-*a* may determine a threshold based on a target number of resources to allocate that are available for high priority transmissions. A UE 115 that has sidelink data to transmit may be associated with a priority (e.g., based on the three bit indicator), and the priority may be compared to the priority indication 210 transmitted by the base station. In some examples, the priority of the sidelink data may be lower than a threshold priority of the priority indication 210, and the UE 115 may not transmit the sidelink data. In some other examples, the priority of the sidelink data may be higher than the threshold priority of the priority indication 210, and the UE 115 may transmit the sidelink data.

In some cases, priority bits may be associated with each transmission, and the bits may be compared to determine preemption. For example, three bits for a sidelink transmission may be compared to three bits of another sidelink transmission to determine whether a sidelink transmission may preempt the other sidelink transmission. In some other cases, a device may implement thresholding to determine the priorities for sidelink transmissions, or a device may implement a decision algorithm or other decision process. For example, a priority value (e.g., a value from 0 to 7) may be associated with a sidelink transmission, and a determination of whether the sidelink transmission is to preempt standard uplink transmissions may be based on comparing a priority value to a threshold, such as a priority threshold included in the priority indication 210. In some cases, a sidelink transmission with priority between 0 and 5 may be considered low priority, and the sidelink transmission may not preempt standard uplink transmissions. A sidelink transmission with priority between 6 and 7 may be high priority, and the sidelink transmission may preempt standard uplink transmissions. An uplink URLLC transmission, however, may preempt a sidelink transmission associated with any priority value. In some implementations, the priority definitions for uplink access and sidelink may vary (e.g., the priority threshold may vary, the priority values may vary, priorities assigned to different communication types or directions may vary, etc.).

In some examples, the base station 105-a may transmit a grant (e.g., a configured grant) to one or more UEs 115 in the wireless coverage area 110-a, which may indicate resources allocated for sidelink transmissions. In some cases, the configured grant may indicate a periodic resource that a UE 115 may use to schedule sidelink transmissions. In some cases, the base station 105-a, however, may determine to use resources indicated by the grant for high priority uplink or sidelink transmissions (e.g., uplink or sidelink transmissions that satisfy a priority threshold), which may increase the reliability of the high priority uplink or sidelink communications and the probability of successful high priority transmissions. For example, the base station 105-a may identify an increase in high priority traffic and may determine to use resources allocated in the configured grant to transmit the higher priority traffic. In such instances, the base station 105-a may transmit a cancellation indication 205 to one or more of UEs 115-a, 115-b, 115-c, or 115-d, instructing the UEs 115 to cancel or refrain from scheduling lower priority transmissions (e.g., transmissions having a priority below the priority threshold included in the priority indication 210). The priority indication 210 may indicate a priority threshold p for cancelling transmissions with a priority less than the priority threshold p in the time-frequency resources indicated by the grant (e.g., the cancellation indication 205 may include the priority indication 210 for the set of time-frequency resources to which the cancellation indication applies). In some cases, the cancellation indication 205 may reduce the amount of traffic or interference to increase reliability for high priority transmissions.

Figure 3:
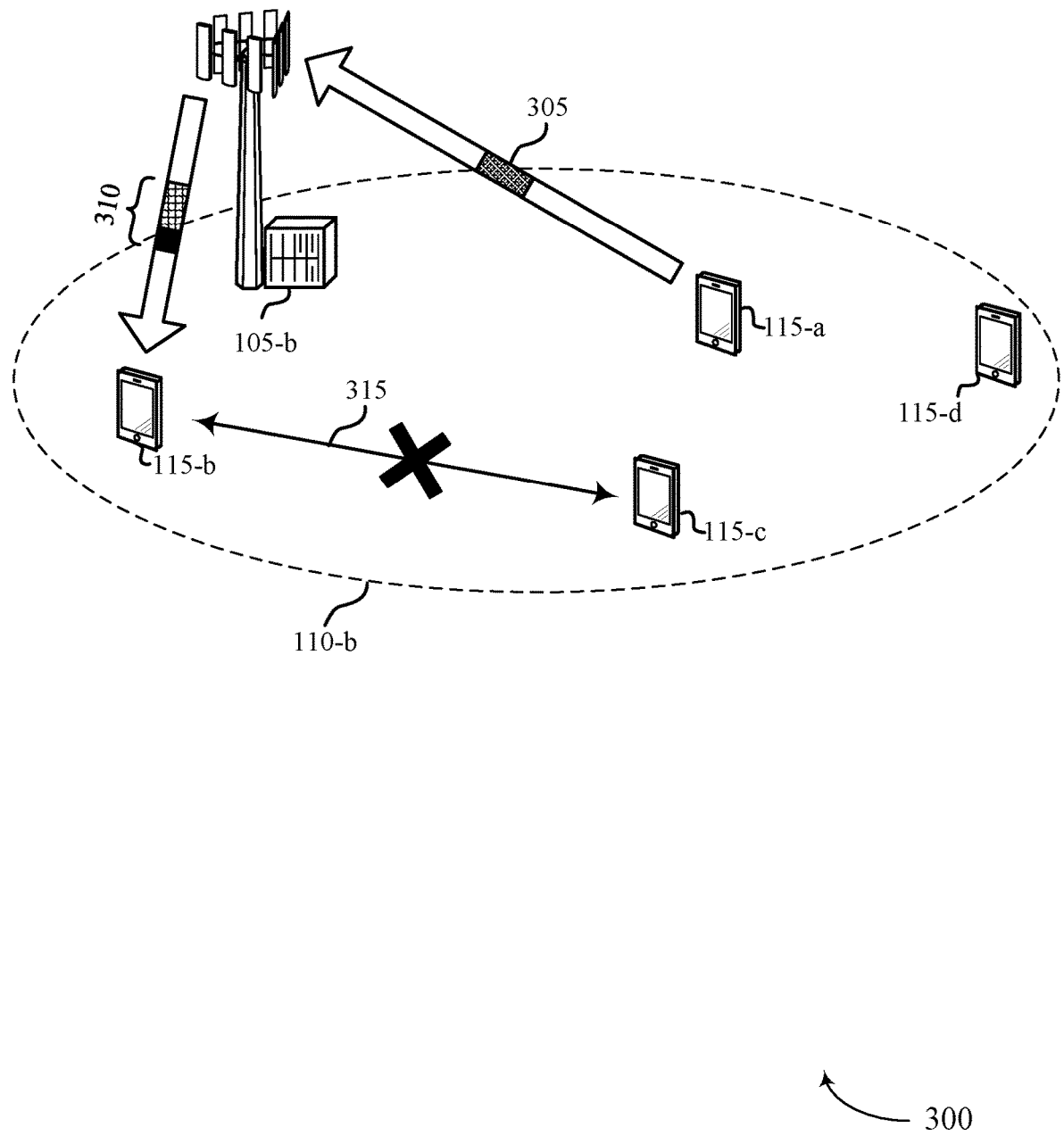

FIG. 3 illustrates an example of a wireless communications system 300 that supports sidelink and uplink prioritized cancellation in accordance with aspects of the present disclosure. In some examples, wireless communications system 300 may implement aspects of wireless communications systems 100 or 200. For example, wireless communications system 300 may include communications between various UEs 115 and a base station 105-b, which may be examples of the corresponding devices described with reference to FIG. 1.

In some examples, a high priority URLLC uplink transmission 305 may preempt a sidelink transmission 315 in a time-frequency resource (e.g., slot) allocated for low priority sidelink communications. The base station 105-b may indicate a periodic resource for sidelink transmissions between UEs in the wireless coverage area 110-b. Based on identifying URLLC data to transmit, the base station 105-b may use the periodic resource for URLLC transmissions, or the base station 105-b may use the periodic resource to for a URLLC transmission in addition to other sidelink transmissions.

To improve the reliability of URLLC uplink transmissions and to reduce interference, the base station 105-b may in some cases transmit a cancellation indication 310 to one or more of UEs 115-a, 115-b, 115-c, or 115-d, instructing the UEs 115 to cancel or refrain from scheduling lower priority transmissions such as sidelink transmission 315 or other transmissions having a priority below a priority threshold.

In some examples, the cancellation indication 310 may contain a priority indication that indicates a priority threshold value p for cancelling transmissions (e.g., sidelink transmission 315) having a priority less than p. In some cases, the cancellation indication 310 may reduce interference from lower priority transmissions during transmission of the higher priority URLLC transmission 305. In some examples, a UE such as one or more of the UEs 115-a, 115-b, 115-c, or 115-d may receive the cancellation indication 310. The one or more UEs 115 may send the cancellation indication 310 including the priority indication p to one or more other UEs (e.g., one or more of the UEs 115-a, 115-b, 115-c, or 115-d) using a sidelink transmission to notify the other UEs to cancel or refrain from scheduling lower priority transmissions (e.g., transmissions having a priority less than the priority threshold included in the priority indication).

Figure 4:
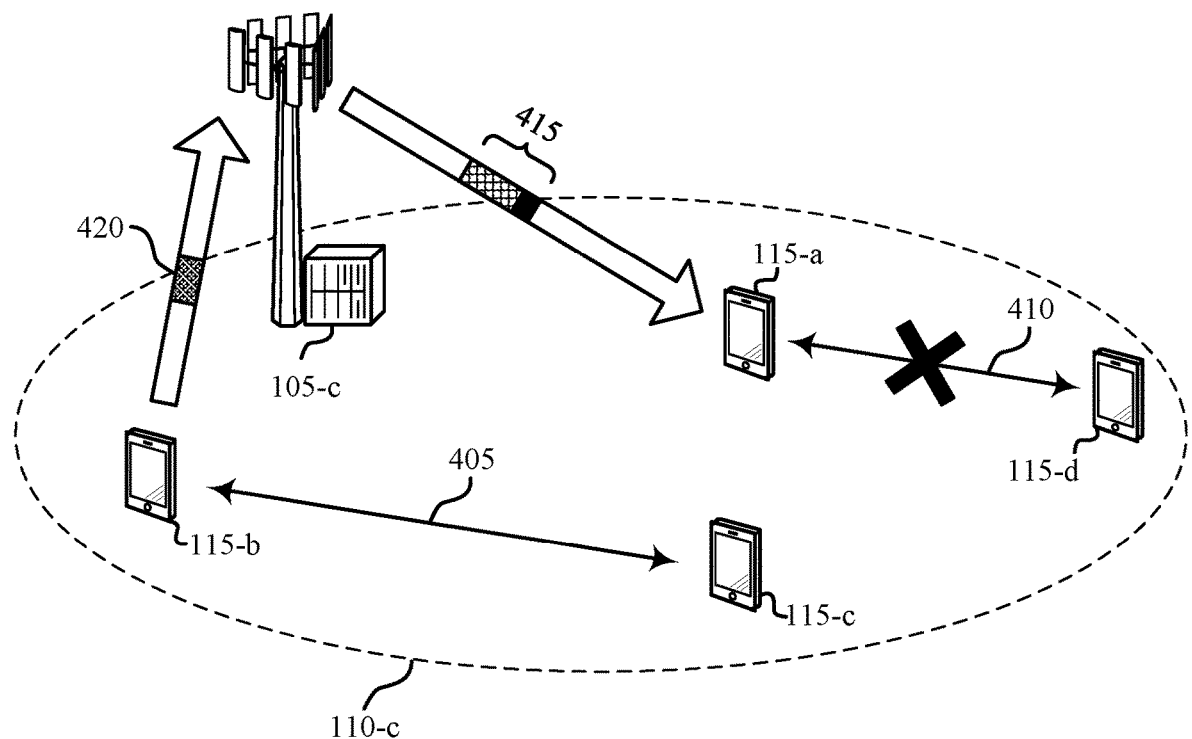

FIG. 4 illustrates an example of a wireless communications system 400 that supports sidelink and uplink prioritized cancellation in accordance with aspects of the present disclosure. In some examples, wireless communications system 400 may implement aspects of wireless communications systems 100, 200, or 300. For example, wireless communications system 400 may include communications between various UEs 115 (e.g., UE 115-c) and a base station 105-c, which may be examples of the corresponding devices described with reference to FIG. 1.

In some examples, a high priority URLLC sidelink transmission 405 may preempt another lower priority sidelink transmission 410 in a time-frequency resource (e.g., slot, mini slot, symbol) allocated for sidelink communications. In some examples, base station 105-c may indicate a periodic resource for sidelink transmissions between UEs in the wireless coverage area 110-c. Based on identifying high priority sidelink data to transmit (e.g., URLLC sidelink transmissions) the base station 105-c may use the periodic resource for a URLLC sidelink transmission, or the base station 105-c may use the periodic resource for a URLLC sidelink transmission in addition to or instead of lower priority sidelink transmissions. In some cases, a UE 115-b may transmit a scheduling request 420 to notify the base station 105-c of the high priority sidelink transmission 405.

To improve the reliability of sidelink URLLC transmissions and to reduce interference between high priority and low priority sidelink communications, the base station 105-c may in some cases transmit a cancellation indication 415 to one or more of the UEs 115-a, 115-b, 115-c, or 115-d instructing the UEs 115 to cancel or refrain from scheduling lower priority transmissions such as sidelink transmission 410, or other transmissions having a priority below a priority threshold.

Additionally or alternatively, the base station 105-c may transmit the cancellation indication 415 using a common periodic resource that it may allocate to one or more of the UEs 115-a, 115-b, 115-c, or 115-d in the coverage area 110-c. In some examples, the cancellation indication 415 may contain a priority indication that indicates a priority threshold p for cancelling transmissions (e.g., sidelink transmission 410) having a priority less than p. In some cases, the cancellation indication 415 may reduce interference from lower priority sidelink transmissions during transmission of higher priority sidelink.

In some examples, cancellation indication 415 may be used to increase the reliability of the high priority transmissions. In some examples, one or more of the UEs 115-a, 115-b, 115-c, or 115-d may receive a cancellation indication 415. The one or more UEs 115 may send the cancellation indication 415 including the priority indication p, to one or more other UEs (e.g., one or more of the UEs 115-a, 115-b, 115-c, or 115-d) using a sidelink transmission to notify the one or more other UEs to cancel or refrain from scheduling lower priority transmissions (e.g., transmissions having a priority less than the priority threshold included in the priority indication).

Figure 5:
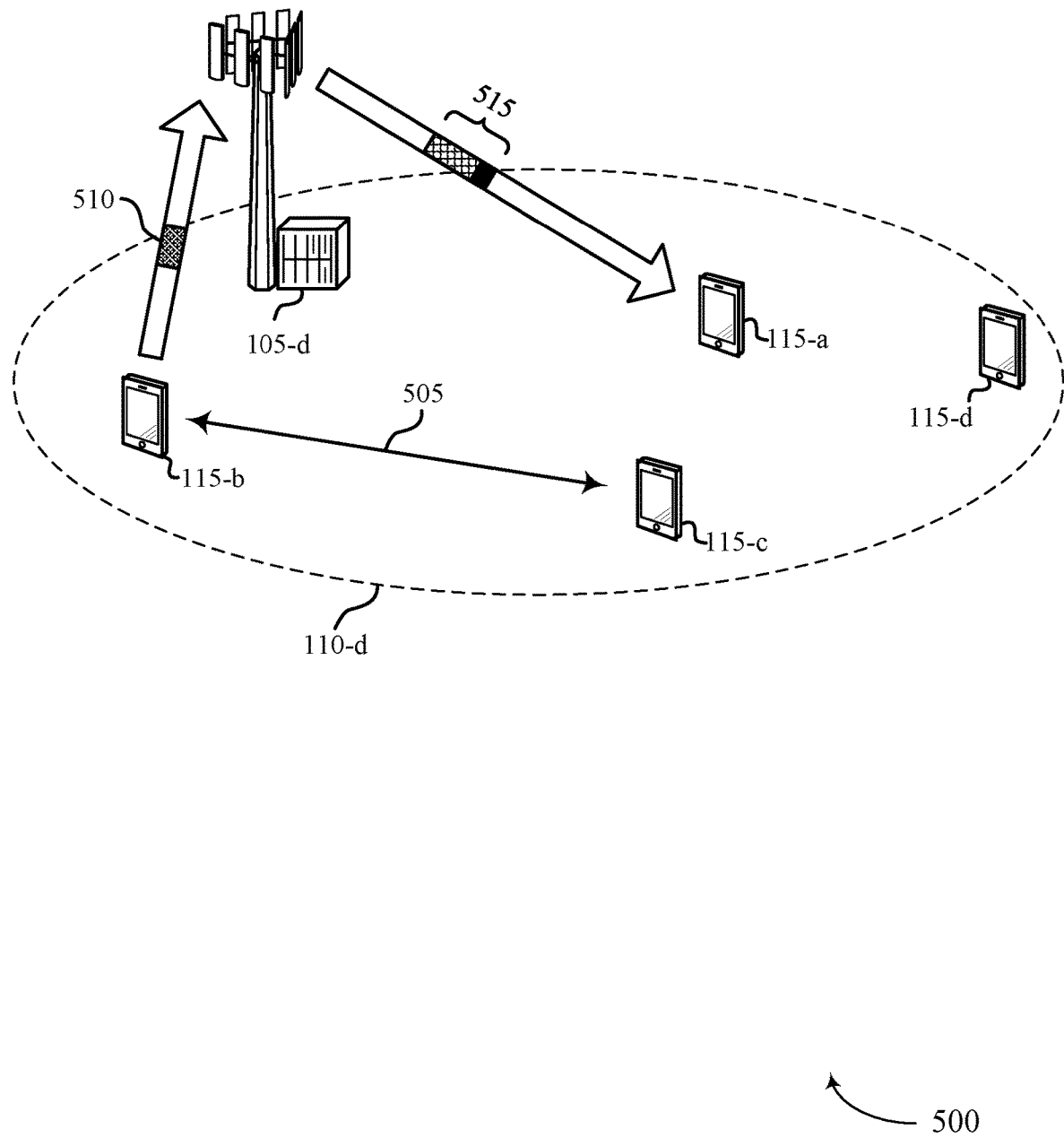

FIG. 5 illustrates an example of a wireless communications system 500 that supports sidelink and uplink prioritized cancellation in accordance with aspects of the present disclosure. In some examples, wireless communications system 500 may implement aspects of wireless communications systems 100, 200, 300, or 400. For example, wireless communications system 500 may include communications between various UE 115 (e.g., UE 115-d) and a base station 105-d, which may be examples of the corresponding devices described with reference to FIG. 1.

In some examples, a high priority URLLC sidelink transmission 505 may preempt low priority uplink transmission in a time-frequency resource (e.g., slot) allocated for uplink eMBB communications between UE 115-a and the base station 105-d. The base station 105-d may indicate a periodic resource for uplink transmissions between one or more UEs 115-a, 115-b, 115-c, or 115-d and the base station 105-d. Based on identifying a high priority (e.g., URLLC) sidelink transmission 505, the base station 105-d may use the periodic resource for transmitting the high priority sidelink transmission. The base station 105-d may in some cases identify the high priority sidelink transmission based on receiving a scheduling request 510 from UE 115-b.

To improve the reliability of sidelink URLLC transmissions and to reduce interference from lower priority transmissions, the base station 105-d may in some cases transmit a cancellation indication 515 to one or more of UEs 115-a, 115-b, 115-c, or 115-d instructing the UEs to cancel or refrain from scheduling lower priority transmissions such as eMBB uplink transmissions (e.g., transmissions having a priority below a priority threshold). In such cases, the base station 105-d may transmit the cancellation indication 515 to the one or more UEs using the configured periodic resource.

In some examples, the cancellation indication 515 may contain a priority indication that indicates a priority threshold value p for cancelling uplink transmissions having a priority less than p. In some examples, issuing the cancellation indication 515 may reduce interference and overall signaling traffic from lower priority uplink transmissions, and may increase the reliability of higher priority transmissions. In some examples, one or more UEs 115-a, 115-b, 115-c, or 115-d may receive the cancellation indication 515 including the priority indication p, and may transmit the cancellation indication to other UEs to notify the other UEs to cancel or refrain from scheduling lower priority transmission (e.g., transmissions having a priority less than the priority threshold included in the priority indication).

Figure 6:
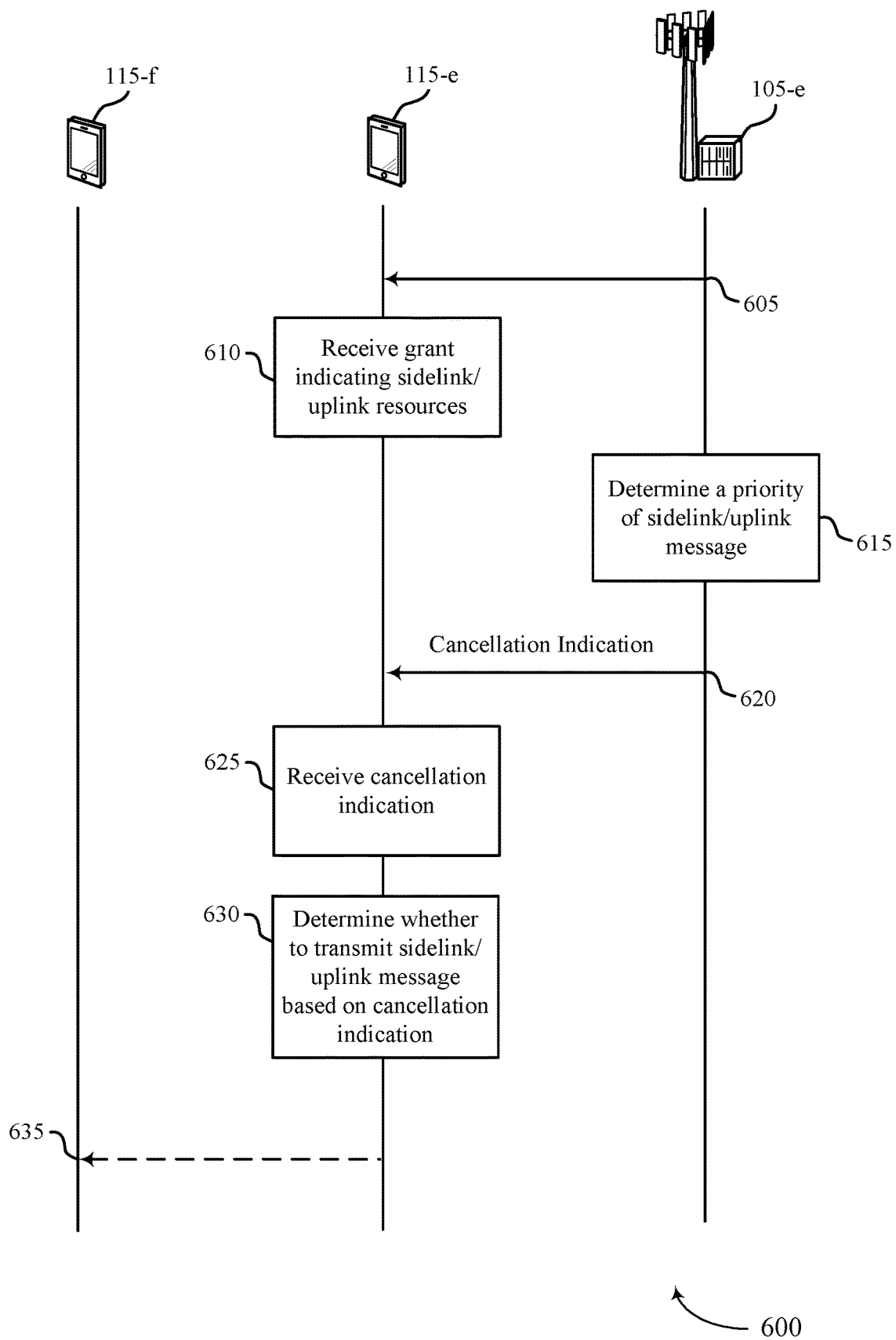
FIG. 6 illustrates an example of a process flow diagram that supports aspects of the present disclosure.

FIG. 6 illustrates an example of a process flow diagram 600 that supports sidelink and uplink prioritized cancellation in accordance with aspects of the present disclosure. In some examples, process flow diagram 600 may implement aspects of wireless communications systems 100, 200, 300, 400, or 500. For example, process flow diagram 600 may describe communications between a base station 105-e and a UE 115-e, which may be examples of the corresponding devices described with reference to FIG. 1.

At 605, the base station 105-e may transmit a grant to the UE 115-e. The grant may be a configured grant indicating a set of time-frequency resources allocated for use by the UE 115-e for sidelink or uplink transmissions. In some cases, the set of time-frequency resources may be periodic.

At 610 the UE 115-e may receive the grant and identify the set of time-frequency resources configured for the UE 115-e or a group of UEs including the UE 115-e.

At 615, the base station 105-e may determine a priority of a message to transmit via a portion of the set of time-frequency resources allocated to the UE 115-e. In some examples, the message may be an uplink message or a sidelink message. Based on the priority of the message, the base station 105-e may determine a priority threshold. The priority threshold may be the same as the priority of the message or may be less than or greater than the priority of the message. Such a determination may be made based on channel conditions, network traffic, capacity, link budget, etc.

In some examples, the base station 105-e may identify transmission of an uplink message by another UE via the portion of the set of time-frequency resources. The base station 105-e may determine the priority threshold based on the uplink message to be transmitted by the other UE. In some cases, the priority threshold may correspond to a priority value (e.g., an indication of high priority or low priority) of the uplink message.

At 620, the base station 105-e may transmit an indication (e.g., a cancellation indication) instructing the UE 115-e to cancel transmissions having a second priority less than a priority threshold. The cancellation indication may instruct the UE 115-e to cancel transmissions or refrain from scheduling messages over the portion of the set of time-frequency resources based on the priority of the message. The base station 105-e may transmit the cancellation indication to one or more UEs of a group of UEs (e.g., including the UE 115-e and the other UE). In some cases, the cancellation indication may cancel sidelink transmissions having the second priority. In some examples, the base station 105-e may identify the transmission of the uplink message by receiving a scheduling request for transmission of the uplink message from the other UE.

In some other examples, the base station 105-e may identify transmission of a sidelink message by the other UE via the portion of the set of time-frequency resources. In some cases, the base station 105-e may identify the transmission of the sidelink message by receiving a scheduling request for transmission of the sidelink message from the other UE to a third UE of the group of UEs including UE 115-e. The base station 105-e may determine the priority threshold based on the sidelink message, the priority threshold corresponding to the sidelink message (e.g., a priority value of the sidelink message). The base station 105-e may transmit the indication to one or more UEs of a group of UEs (e.g., including UE 115-e and the other UE) based on the sidelink message. In some cases, the cancellation indication may include the priority threshold, and may include an indication of the portion of the set of time-frequency resources.

At 625, the UE 115-*e* may receive the indication (e.g., the cancellation indication) instructing the UE 115-*e* to cancel transmissions having a priority less than the priority threshold. In some examples, the cancellation indication may instruct the UE 115-*e* to cancel transmissions during at least a portion of the set of time-frequency resources.

At 630, the UE 115-*e* may determine whether to transmit one or more messages via at least the portion of the set of time-frequency resources. In some examples, the one or more messages may be sidelink or uplink messages. In some examples, the UE 115-*e* may determine that the one or more messages have a second priority greater than the priority threshold, and the UE 115-*e* may transmit the one or more messages based on determining the priority of the one or more messages exceeds the priority threshold.

In some examples, the UE 115-*e* may determine that the one or more messages have a second priority that is less than the priority threshold. The UE 115-*e* may refrain from transmitting the one or more messages based on the determination of the second priority.

In some other examples, the UE 115-*e* may identify resources scheduled for an uplink message. In some cases, the scheduled resources may at least partially overlap with the set of time-frequency resources indicated by the grant transmitted by the base station 105-*e*. In such cases, the UE 115-*e* may refrain from transmitting the uplink message based on the indication and based on the uplink message having the second priority.

At 635, the UE 115-*e* may transmit a preemption indication to a second UE 115-*f*. In some examples, the preemption indication may indicate cancellation of the transmission of the one or more messages from the UE 115-*e*. In some other examples, the UE 115-*e* may transmit an indication of the priority threshold to the UE 115-*f* which may indicate that transmissions having priorities less than the priority threshold are canceled. In some cases, the priority threshold may be included in the preemption indication.

Figure 7:
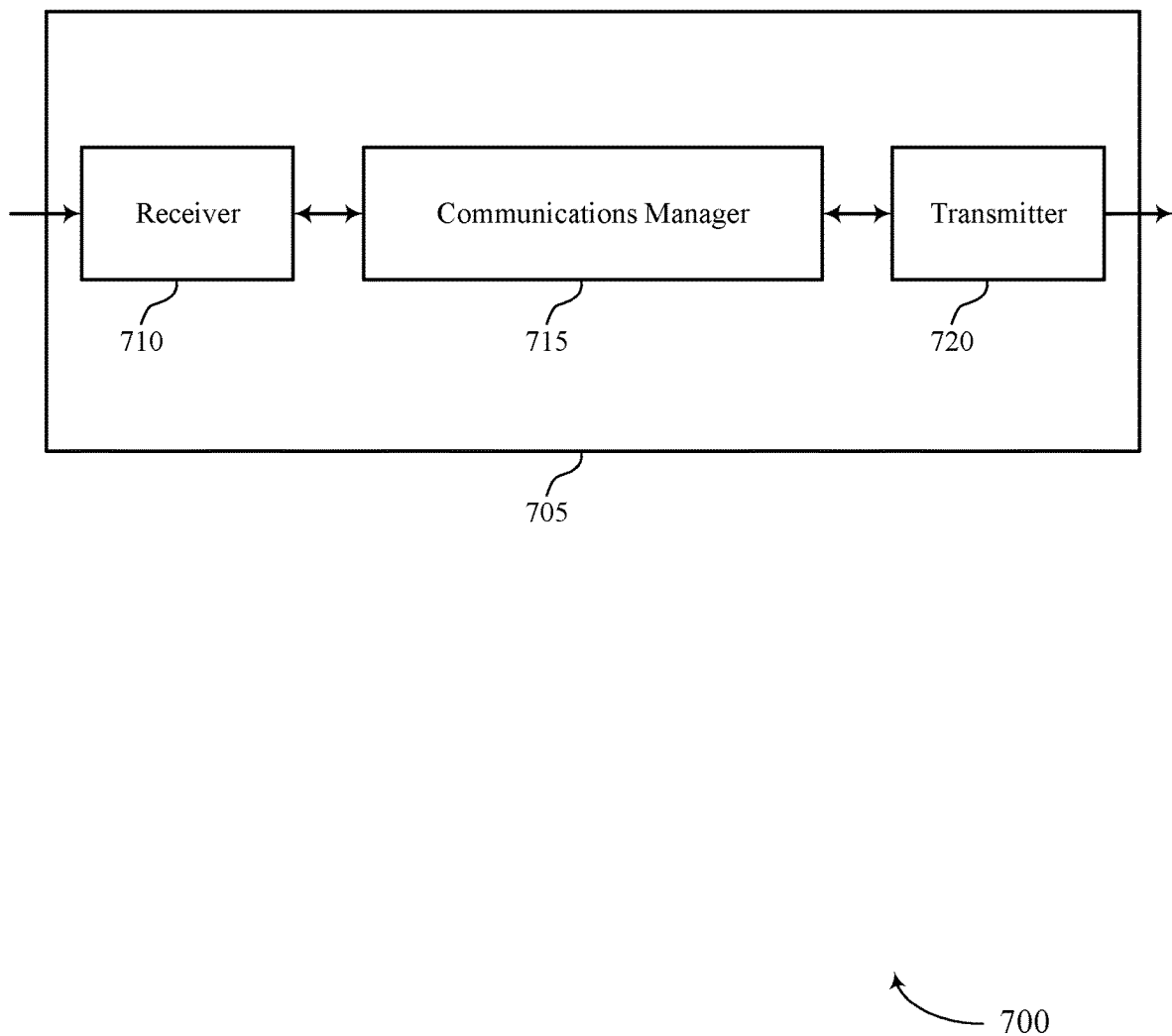
FIGS. 7 and 8 show block diagrams of devices that support aspects of the present disclosure.

FIG. 7 shows a block diagram 700 of a device 705 that supports sidelink and uplink prioritized cancellation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sidelink and uplink prioritized cancellation, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a grant for the UE that indicates a set of time-frequency resources configured for sidelink or uplink communications for the UE, receive, from the base station, an indication instructing the UE to cancel transmissions having a priority less than a priority threshold during at least a portion of the set of time-frequency resources, and determine whether to transmit one or more messages via at least the portion of the set of time-frequency resources based on the indication. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable mitigation of interference for transmissions that exceed a threshold priority (e.g., such as URLLC transmissions). At least one implementation may reduce latency and increase the reliability of high priority transmissions, and may reduce the number of signaling collisions that occur between low priority and high priority data.

Based on implementing the prioritized cancellation techniques as described herein, one or more processors of the device 705 (e.g., processor(s) controlling or incorporated with one or more of receiver 710, communications manager 715, and transmitter 720) may reduce latency for high priority transmissions, and may increase the likelihood that high priority transmissions are successfully transmitted by network devices.

Figure 8:
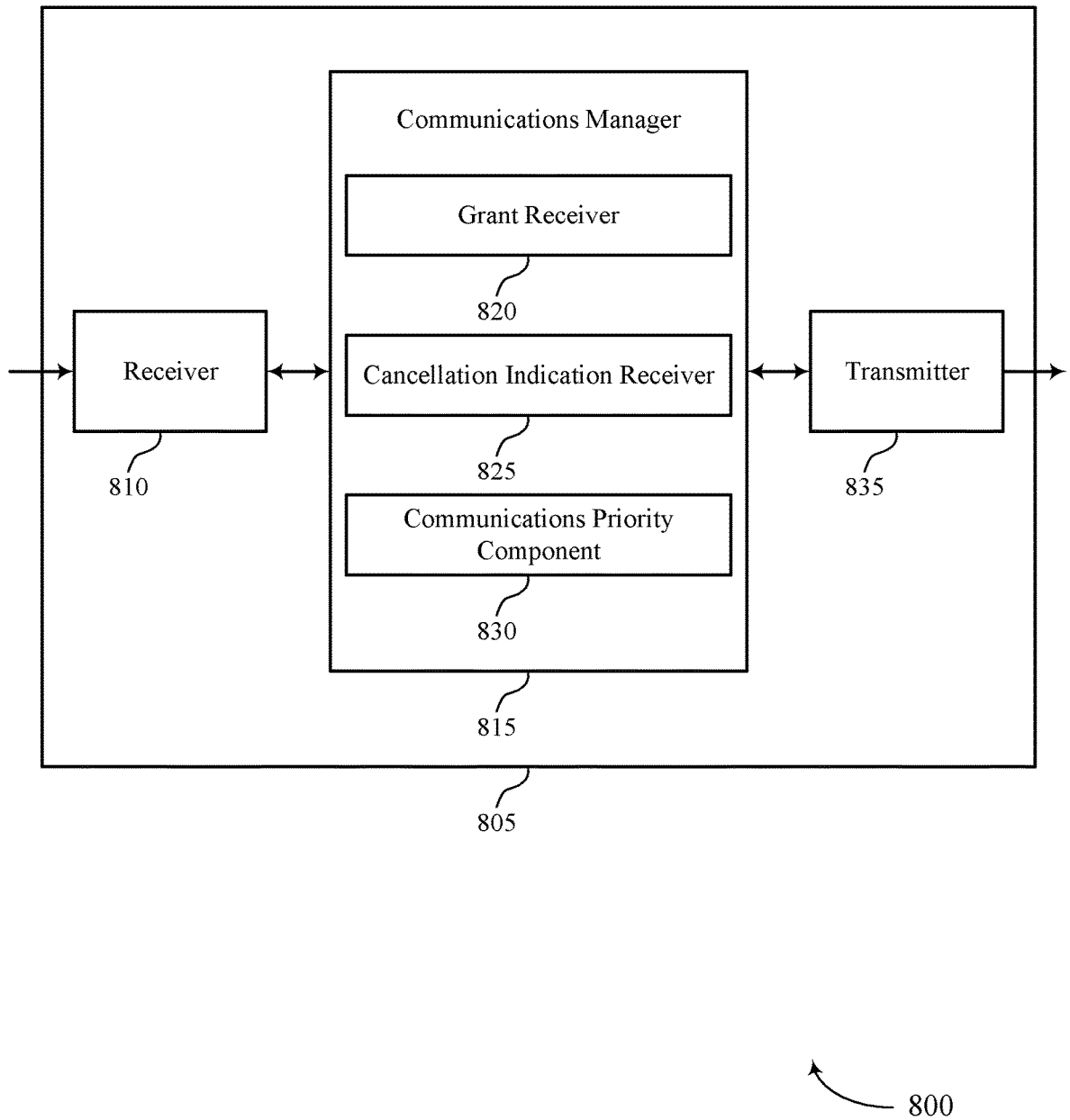

FIG. 8 shows a block diagram 800 of a device 805 that supports sidelink and uplink prioritized cancellation in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to sidelink and uplink prioritized cancellation, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a grant receiver 820, a cancellation indication receiver 825, and a communications priority component 830. The communications manager 815 may be an example of aspects of the communications manager 1010 described herein.

The grant receiver 820 may receive, from a base station, a grant for the UE that indicates a set of time-frequency resources configured for sidelink or uplink communications for the UE.

The cancellation indication receiver 825 may receive, from the base station, an indication instructing the UE to cancel transmissions having a priority less than a priority threshold during at least a portion of the set of time-frequency resources.

The communications priority component 830 may determine whether to transmit one or more messages via at least the portion of the set of time-frequency resources based on the indication.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
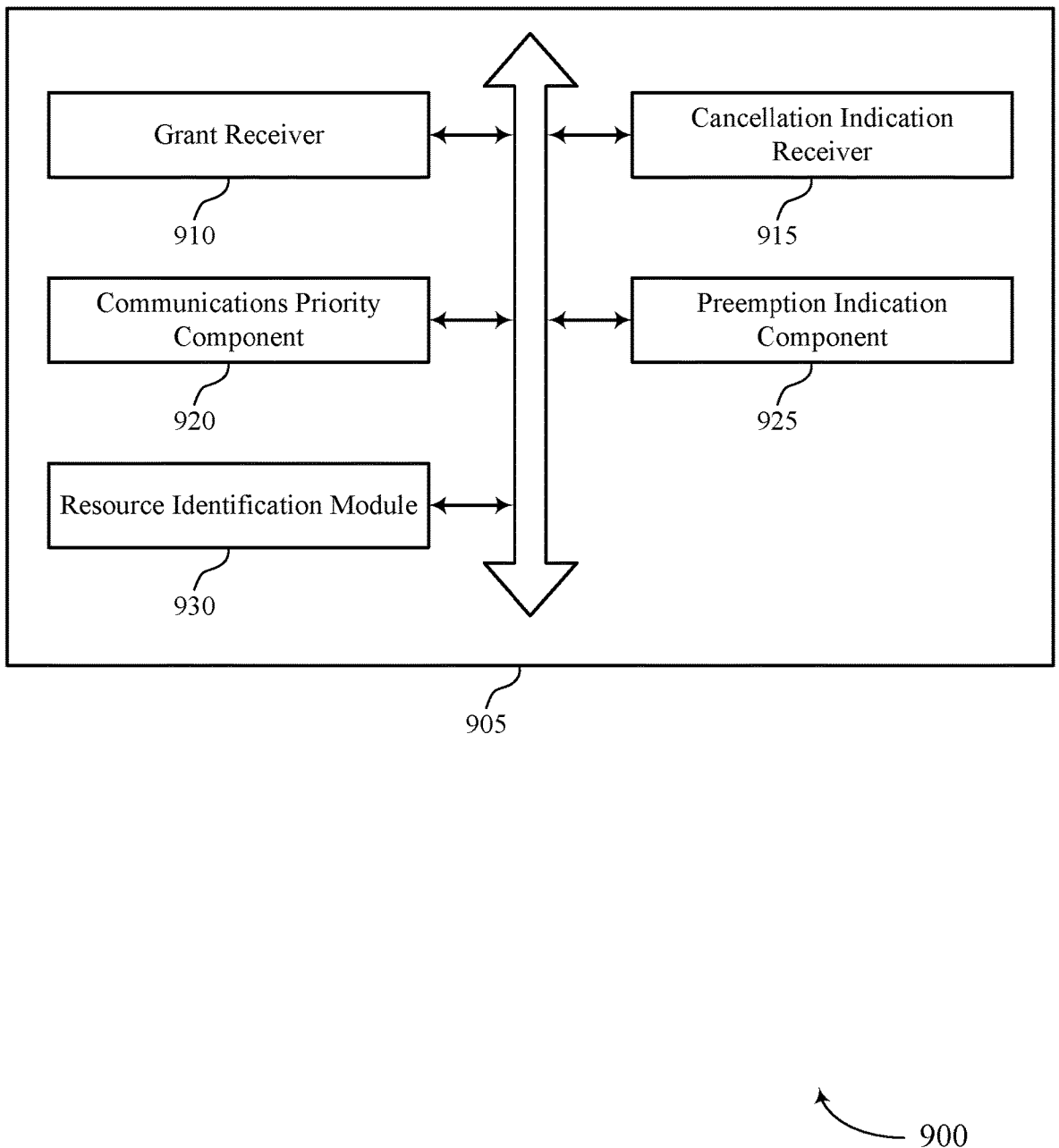
FIG. 9 shows a block diagram of a communications manager that supports aspects of the present disclosure.

FIG. 9 shows a block diagram 900 of a communications manager 905 that supports sidelink and uplink prioritized cancellation in accordance with aspects of the present disclosure. The communications manager 905 may be an example of aspects of a communications manager 715, a communications manager 815, or a communications manager 1010 described herein. The communications manager 905 may include a grant receiver 910, a cancellation indication receiver 915, a communications priority component 920, a preemption indication component 925, and a resource identification module 930. Each of these modules may communicate, directly or indirectly, with one another (e.g., via one or more buses).

The grant receiver 910 may receive, from a base station, a grant for the UE that indicates a set of time-frequency resources configured for sidelink or uplink communications for the UE. In some cases, the set of time-frequency resources of the grant are periodic.

The resource identification module 930 may identify additional resources scheduled for an uplink message from the UE, where the additional resources at least partially overlap the set of time-frequency resources indicated by the grant.

The cancellation indication receiver 915 may receive, from the base station, an indication instructing the UE to cancel transmissions having a priority less than a priority threshold during at least a portion of the set of time-frequency resources. The communications priority component 920 may determine whether to transmit one or more messages via at least the portion of the set of time-frequency resources based on the indication.

In some other examples, the communications priority component 920 may transmit, to a second UE, an indication of the priority threshold indicating that transmissions having priorities less than the priority threshold are canceled. In some examples, the communications priority component 920 may determine to transmit the one or more messages based on the one or more messages having a second priority greater than the priority threshold.

In some examples, the communications priority component 920 may determine to refrain from transmitting the one or more messages based on the one or more messages having a second priority less than the priority threshold. In some examples, the communications priority component 920 may refrain from transmitting the uplink message based on the indication and the uplink message having the second priority.

In some cases, the indication of the priority threshold is included in a preemption indication. In some cases, the one or more messages are sidelink messages or uplink messages.

The preemption indication component 925 may transmit, based on determining to refrain from transmitting, a preemption indication to a second UE indicating cancellation of transmission of the one or more messages from the UE.

Figure 10:
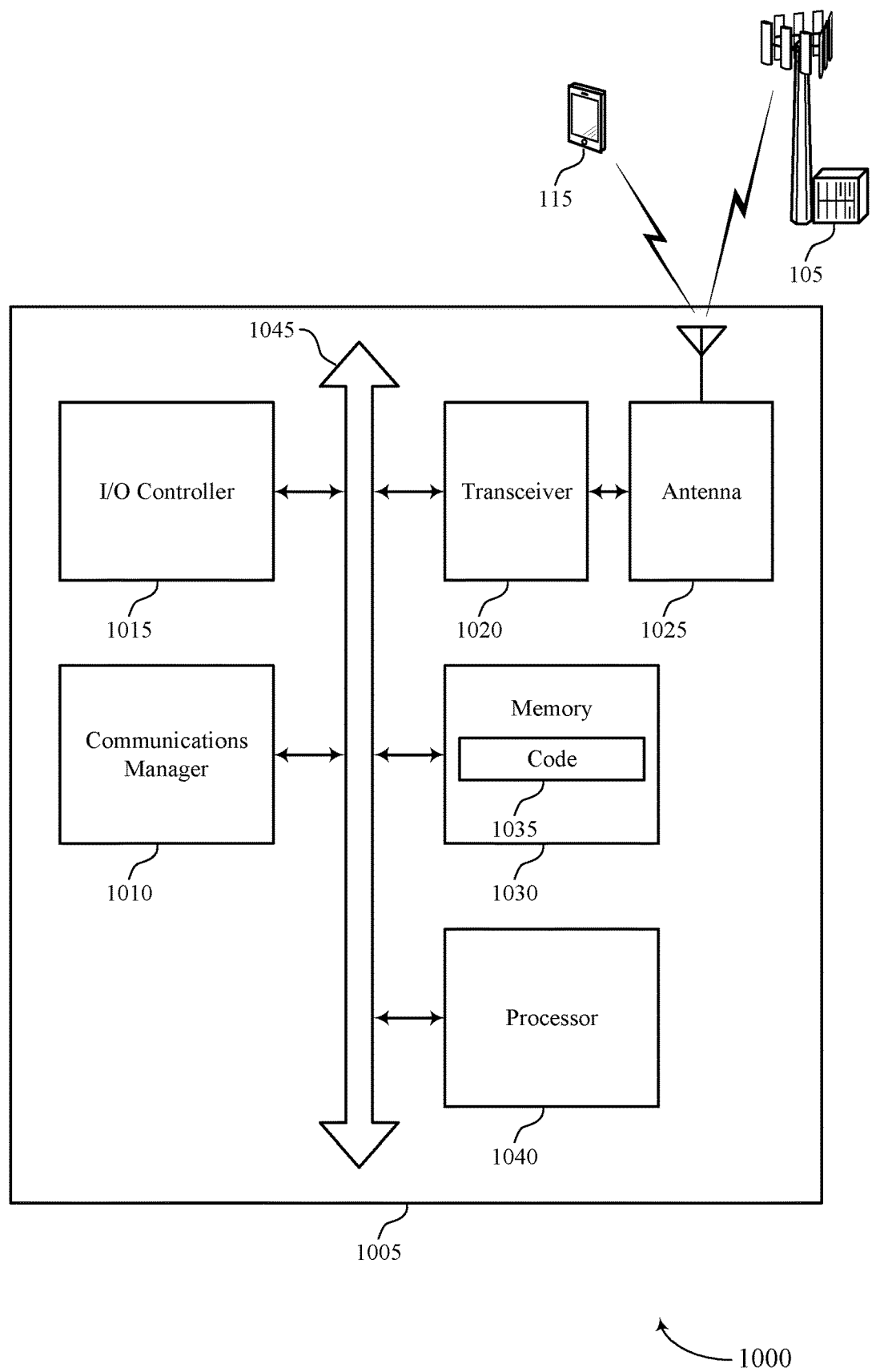
FIG. 10 shows a diagram of a system including a device that supports aspects of the present disclosure.

FIG. 10 shows a diagram of a system 1000 including a device 1005 that supports sidelink and uplink prioritized cancellation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a grant for the UE that indicates a set of time-frequency resources configured for sidelink or uplink communications for the UE, receive, from the base station, an indication instructing the UE to cancel transmissions having a priority less than a priority threshold during at least a portion of the set of time-frequency resources, and determine whether to transmit one or more messages via at least the portion of the set of time-frequency resources based on the indication.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink and uplink prioritized cancellation).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
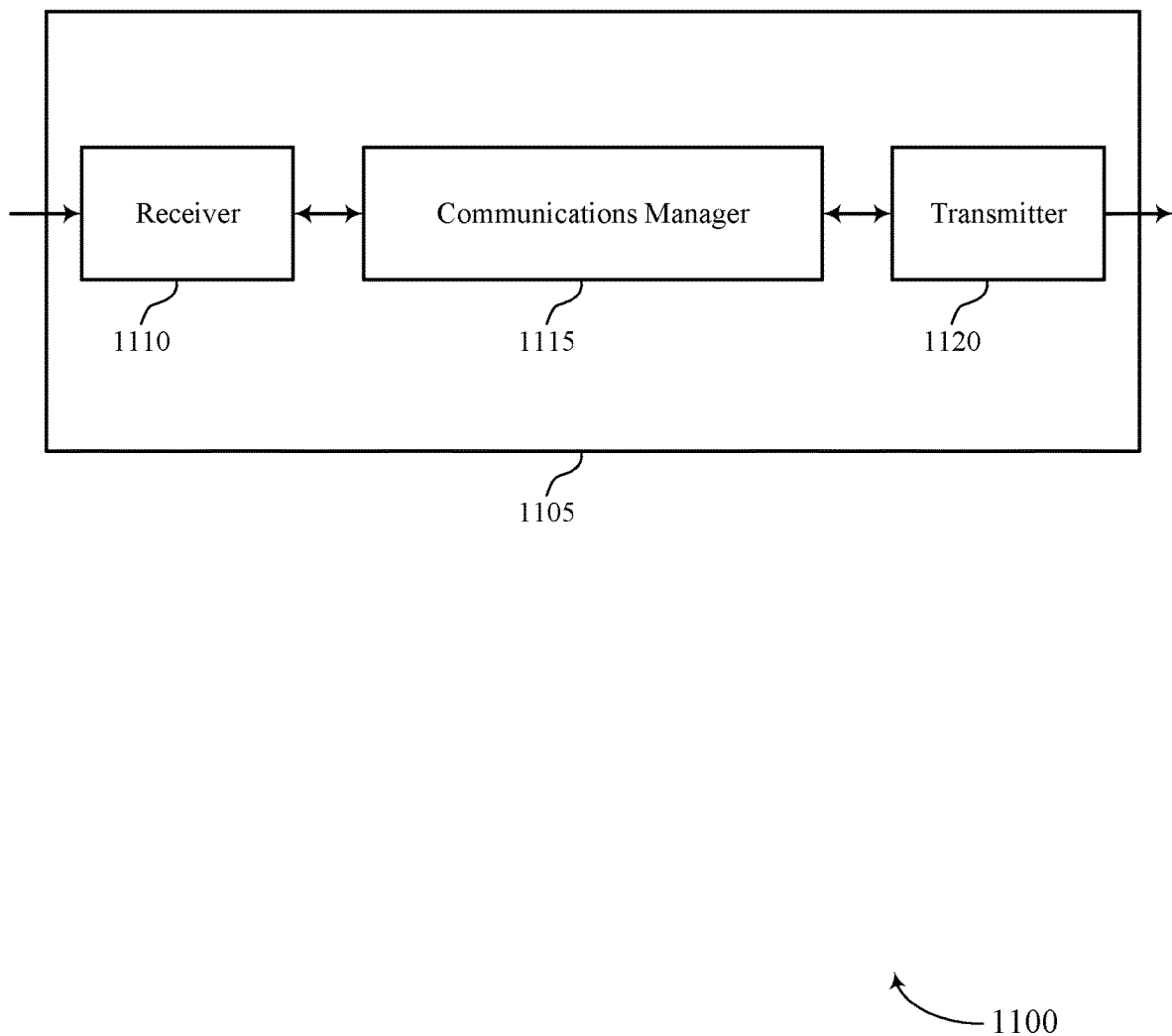
FIGS. 11 and 12 show block diagrams of devices that support aspects of the present disclosure.

FIG. 11 shows a block diagram 1100 of a device 1105 that supports sidelink and uplink prioritized cancellation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink and uplink prioritized cancellation, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a grant to a UE that indicates a set of time-frequency resources configured for sidelink or uplink communications for the UE, determine a priority of a message for transmission via a portion of the set of time-frequency resources, the message being one of an uplink or a sidelink, and transmit an indication instructing the UE to cancel transmissions having a second priority less than a priority threshold during the portion of the set of time-frequency resources based on the priority of the message. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
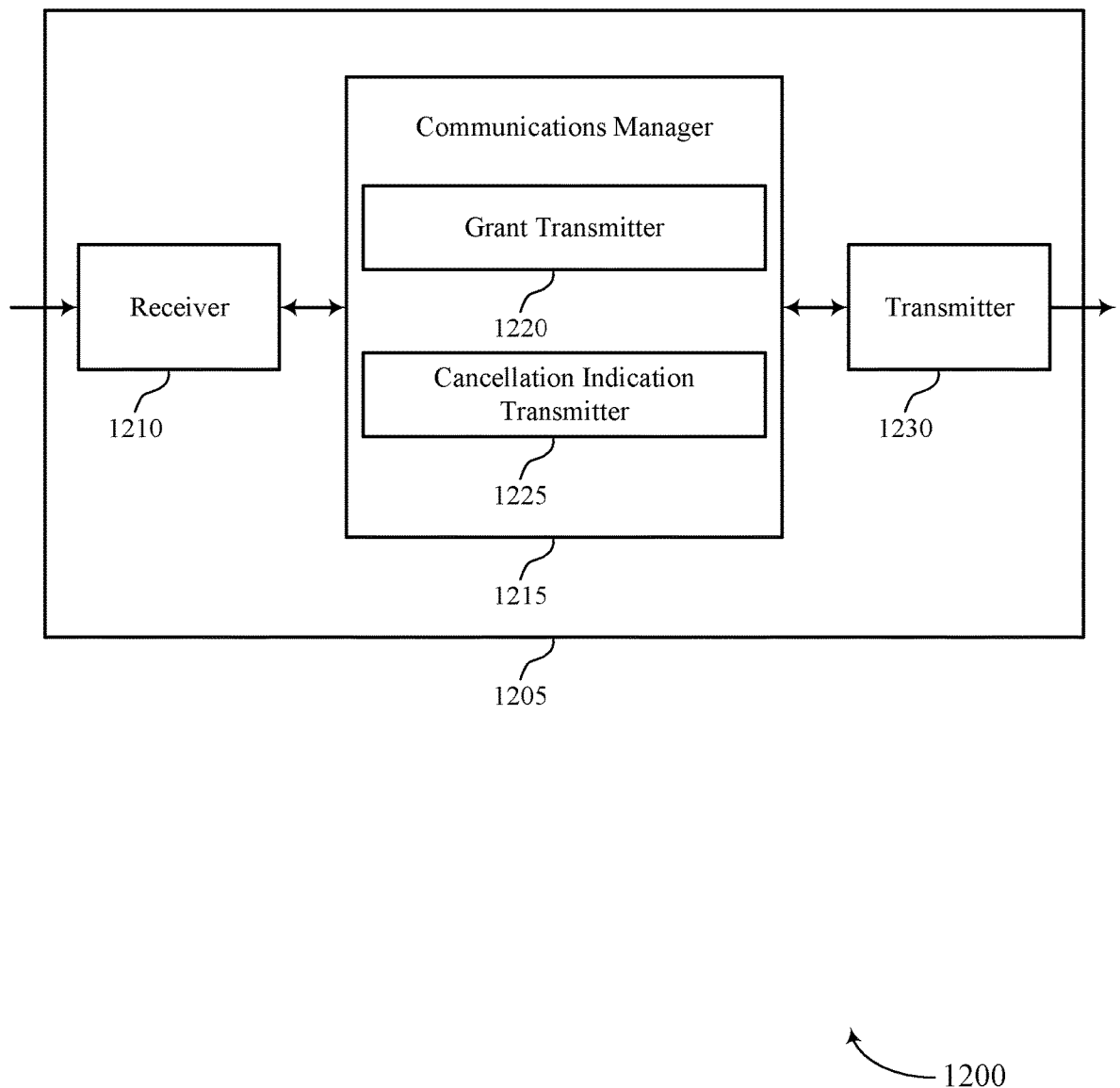

FIG. 12 shows a block diagram 1200 of a device 1205 that supports sidelink and uplink prioritized cancellation in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to sidelink and uplink prioritized cancellation, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a grant transmitter 1220 and a cancellation indication transmitter 1225. The communications manager 1215 may be an example of aspects of the communications manager 1410 described herein.

The grant transmitter 1220 may transmit a grant to a UE that indicates a set of time-frequency resources configured for sidelink or uplink communications for the UE.

The cancellation indication transmitter 1225 may determine a priority of a message for transmission via a portion of the set of time-frequency resources, the message being one of an uplink or a sidelink and transmit an indication instructing the UE to cancel transmissions having a second priority less than a priority threshold during the portion of the set of time-frequency resources based on the priority of the message.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
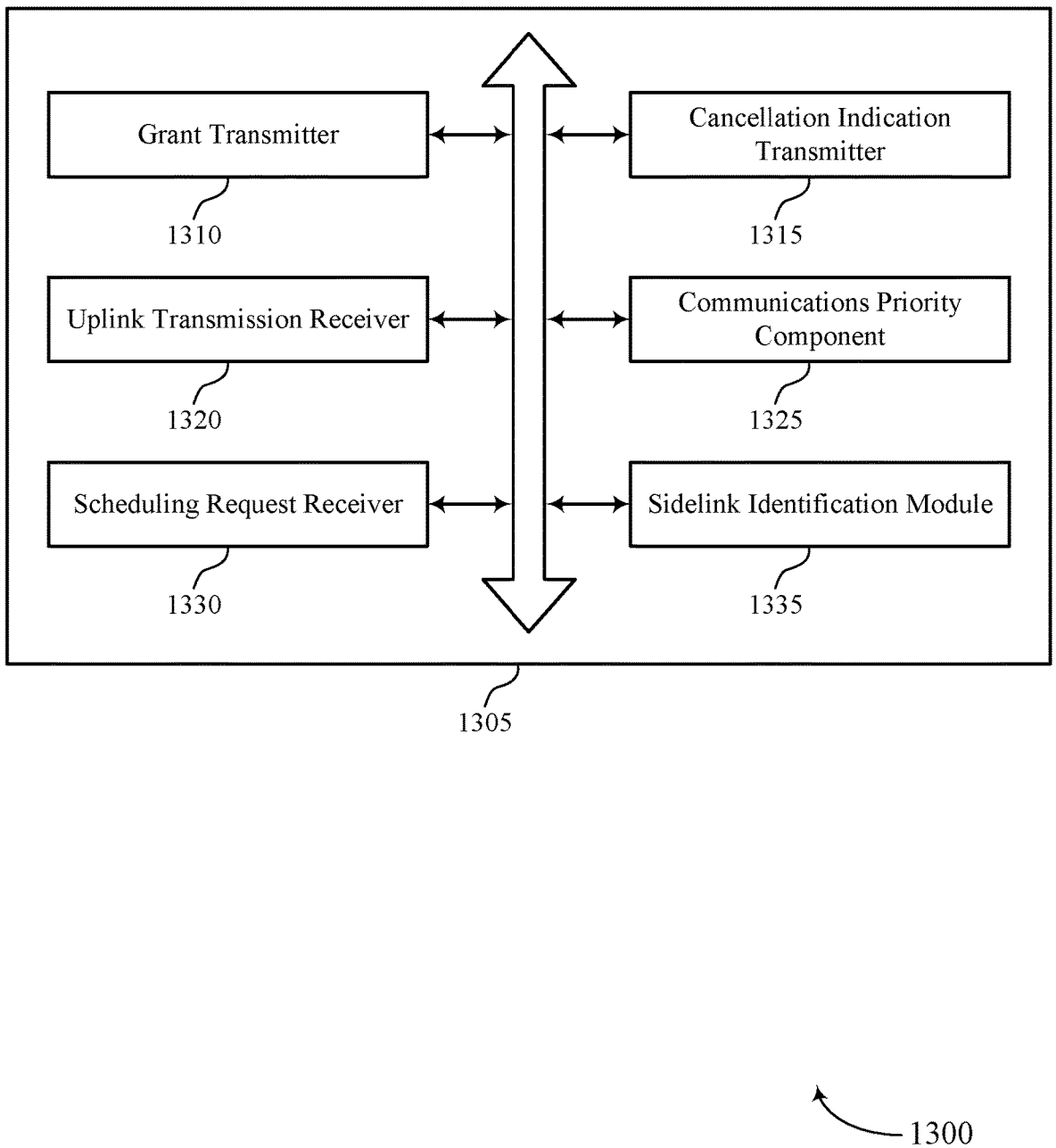
FIG. 13 shows a block diagram of a communications manager that supports aspects of the present disclosure.

FIG. 13 shows a block diagram 1300 of a communications manager 1305 that supports sidelink and uplink prioritized cancellation in accordance with aspects of the present disclosure. The communications manager 1305 may be an example of aspects of a communications manager 1115, a communications manager 1215, or a communications manager 1410 described herein. The communications manager 1305 may include a grant transmitter 1310, a cancellation indication transmitter 1315, an uplink transmission receiver 1320, a communications priority component 1325, a scheduling request receiver 1330, and a sidelink identification module 1335. Each of these modules may communicate, directly or indirectly, with one another (e.g., via one or more buses).

The grant transmitter 1310 may transmit a grant to a UE that indicates a set of time-frequency resources configured for sidelink or uplink communications for the UE. In some cases, the set of time-frequency resources of the grant are periodic.

The cancellation indication transmitter 1315 may determine a priority of a message for transmission via a portion of the set of time-frequency resources, the message being one of an uplink or a sidelink message. In some examples, the cancellation indication transmitter 1315 may transmit an indication instructing the UE to cancel transmissions having a second priority less than a priority threshold during the portion of the set of time-frequency resources based on the priority of the message.

In some examples, the cancellation indication transmitter 1315 may transmit, based on the uplink message, the indication to one or more UEs of a group of UEs for cancellation of sidelink transmissions having the second priority. In some examples, the cancellation indication transmitter 1315 may transmit the indication to one or more UEs of a group of UEs based on the sidelink message, the cancellation indication including the priority threshold.

In some cases, the cancellation indication includes the priority threshold. In some cases, the cancellation indication includes an indication of the portion of the set of time-frequency resources.

The uplink transmission receiver 1320 may identify transmission of an uplink message by a second UE via the portion of the set of time-frequency resources. The communications priority component 1325 may determine the priority threshold based on the uplink message. The sidelink identification module 1335 may identify transmission of a sidelink message by a second UE via the portion of the set of time-frequency resources.

The scheduling request receiver 1330 may receive a scheduling request for transmission of the uplink message from the second UE. In some examples, the scheduling request receiver 1330 may receive a scheduling request for transmission of the sidelink message from the second UE to a third UE of the group of UEs.

In some examples, the communications priority component 1325 may determine the priority threshold based on the sidelink message, where the priority threshold corresponds to the sidelink message. In some cases, the priority threshold corresponds to a priority value of the uplink message. In some cases, the priority threshold corresponds to a priority value of the sidelink message.

Figure 14:
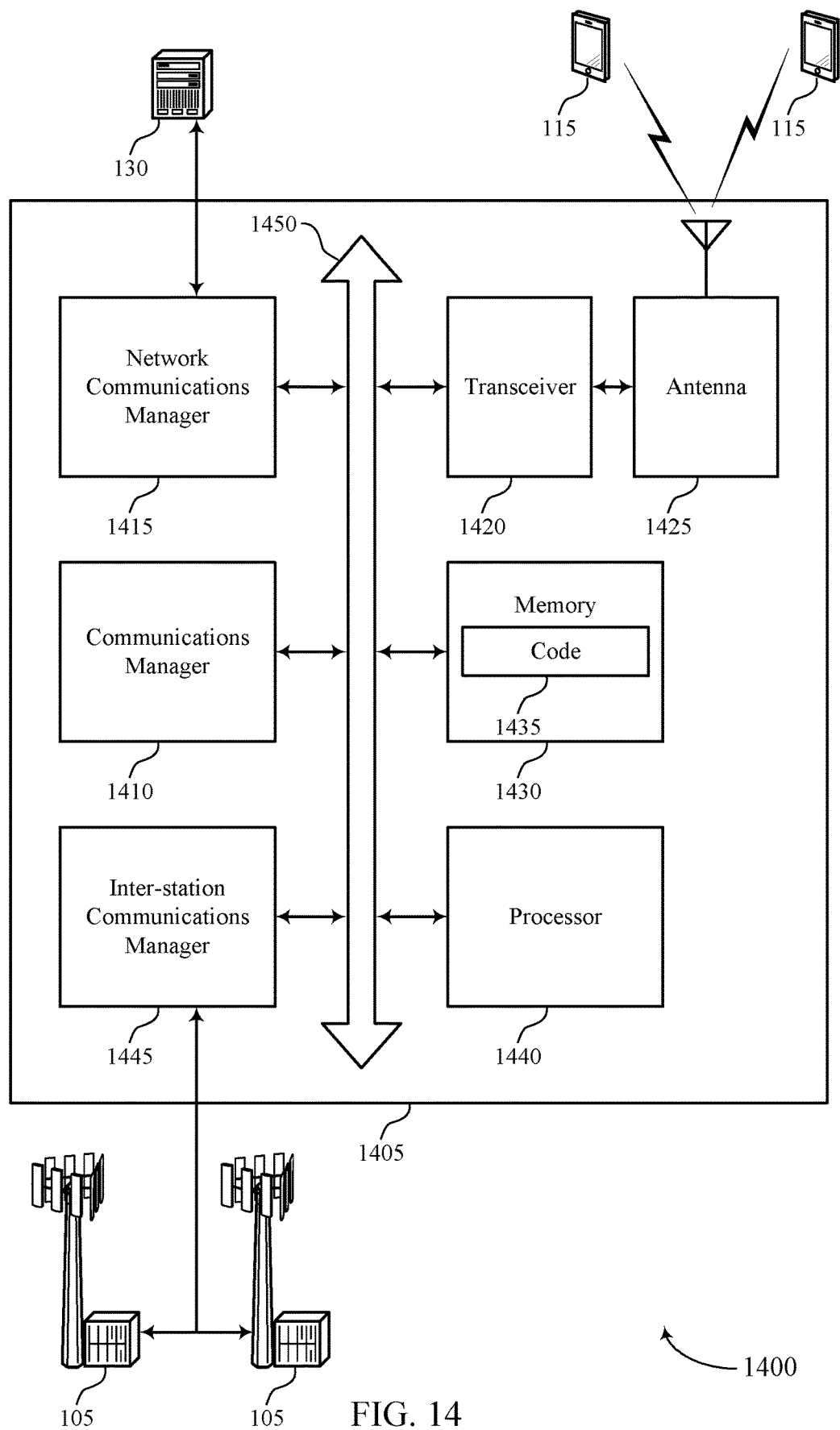
FIG. 14 shows a diagram of a system including a device that supports aspects of the present disclosure.

FIG. 14 shows a diagram of a system 1400 including a device 1405 that supports sidelink and uplink prioritized cancellation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a grant to a UE that indicates a set of time-frequency resources configured for sidelink or uplink communications for the UE, determine a priority of a message for transmission via a portion of the set of time-frequency resources, the message being one of an uplink or a sidelink, and transmit an indication instructing the UE to cancel transmissions having a second priority less than a priority threshold during the portion of the set of time-frequency resources based on the priority of the message.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting sidelink and uplink prioritized cancellation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
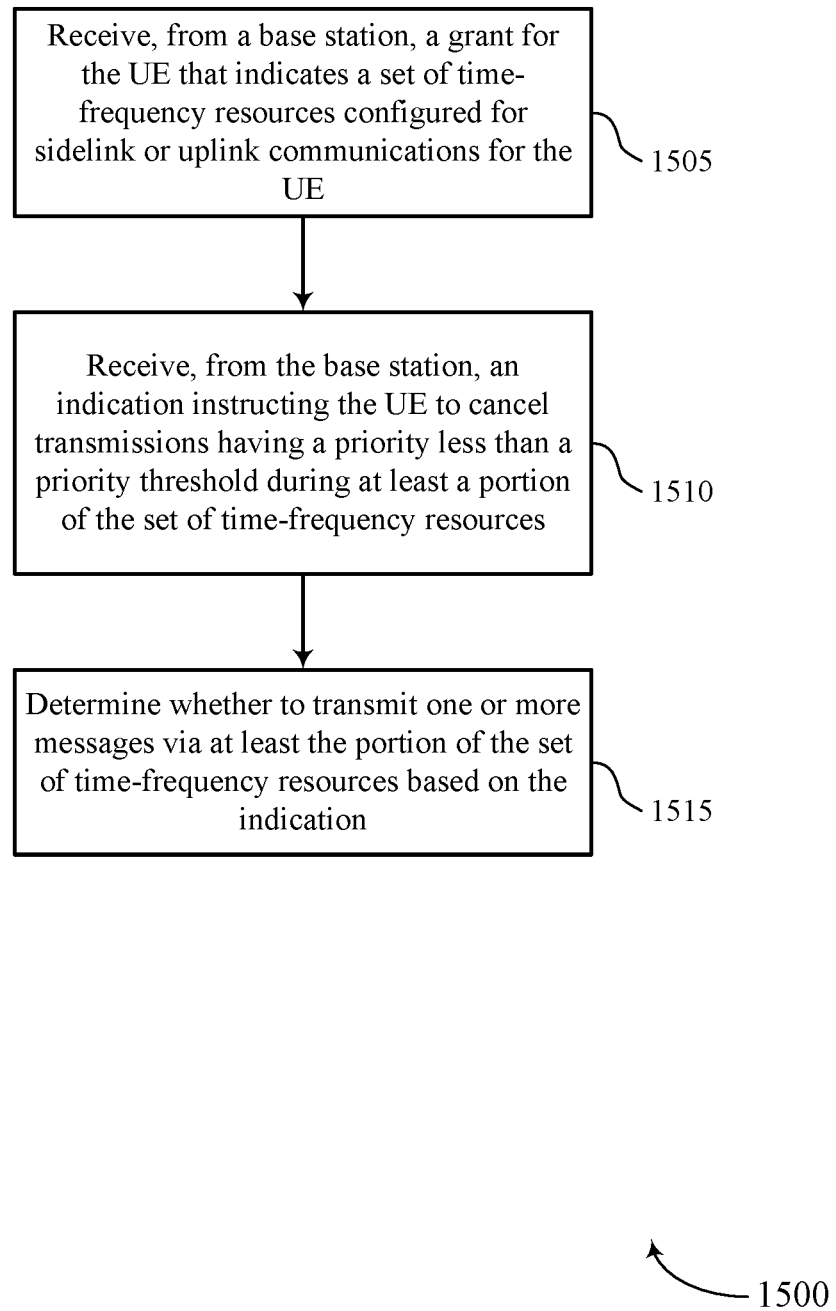
FIGS. 15 through 21 show flowcharts illustrating methods that support aspects of the present disclosure.

FIG. 15 shows a flowchart illustrating a method 1500 that supports sidelink and uplink prioritized cancellation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a grant for the UE that indicates a set of time-frequency resources configured for sidelink or uplink communications for the UE. The operations of 1505 may be performed according to the methods described herein. In some examples, aspects of the operations of 1505 may be performed by a grant receiver as described with reference to FIGS. 7 through 10.

At 1510, the UE may receive, from the base station, an indication instructing the UE to cancel transmissions having a priority less than a priority threshold during at least a portion of the set of time-frequency resources. The operations of 1510 may be performed according to the methods described herein. In some examples, aspects of the operations of 1510 may be performed by a cancellation indication receiver as described with reference to FIGS. 7 through 10.

At 1515, the UE may determine whether to transmit one or more messages via at least the portion of the set of time-frequency resources based on the indication. The operations of 1515 may be performed according to the methods described herein. In some examples, aspects of the operations of 1515 may be performed by a communications priority component as described with reference to FIGS. 7 through 10.

Figure 16:
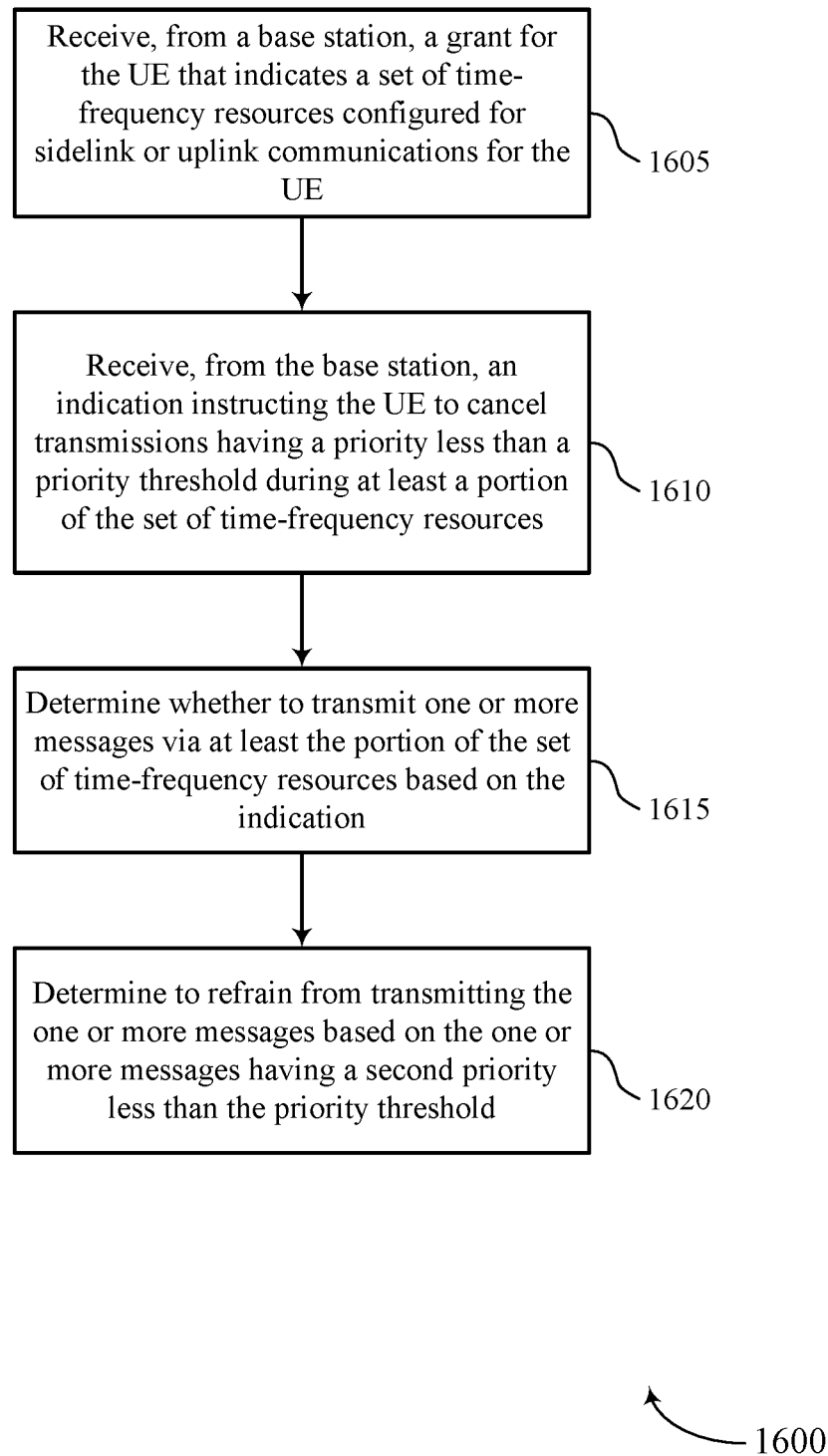

FIG. 16 shows a flowchart illustrating a method 1600 that supports sidelink and uplink prioritized cancellation in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a grant for the UE that indicates a set of time-frequency resources configured for sidelink or uplink communications for the UE. The operations of 1605 may be performed according to the methods described herein. In some examples, aspects of the operations of 1605 may be performed by a grant receiver as described with reference to FIGS. 7 through 10.

At 1610, the UE may receive, from the base station, an indication instructing the UE to cancel transmissions having a priority less than a priority threshold during at least a portion of the set of time-frequency resources. The operations of 1610 may be performed according to the methods described herein. In some examples, aspects of the operations of 1610 may be performed by a cancellation indication receiver as described with reference to FIGS. 7 through 10.

At 1615, the UE may determine whether to transmit one or more messages via at least the portion of the set of time-frequency resources based on the indication. The operations of 1615 may be performed according to the methods described herein. In some examples, aspects of the operations of 1615 may be performed by a communications priority component as described with reference to FIGS. 7 through 10.

At 1620, the UE may determine to refrain from transmitting the one or more messages based on the one or more messages having a second priority less than the priority threshold. The operations of 1620 may be performed according to the methods described herein. In some examples, aspects of the operations of 1620 may be performed by a communications priority component as described with reference to FIGS. 7 through 10.

Figure 17:
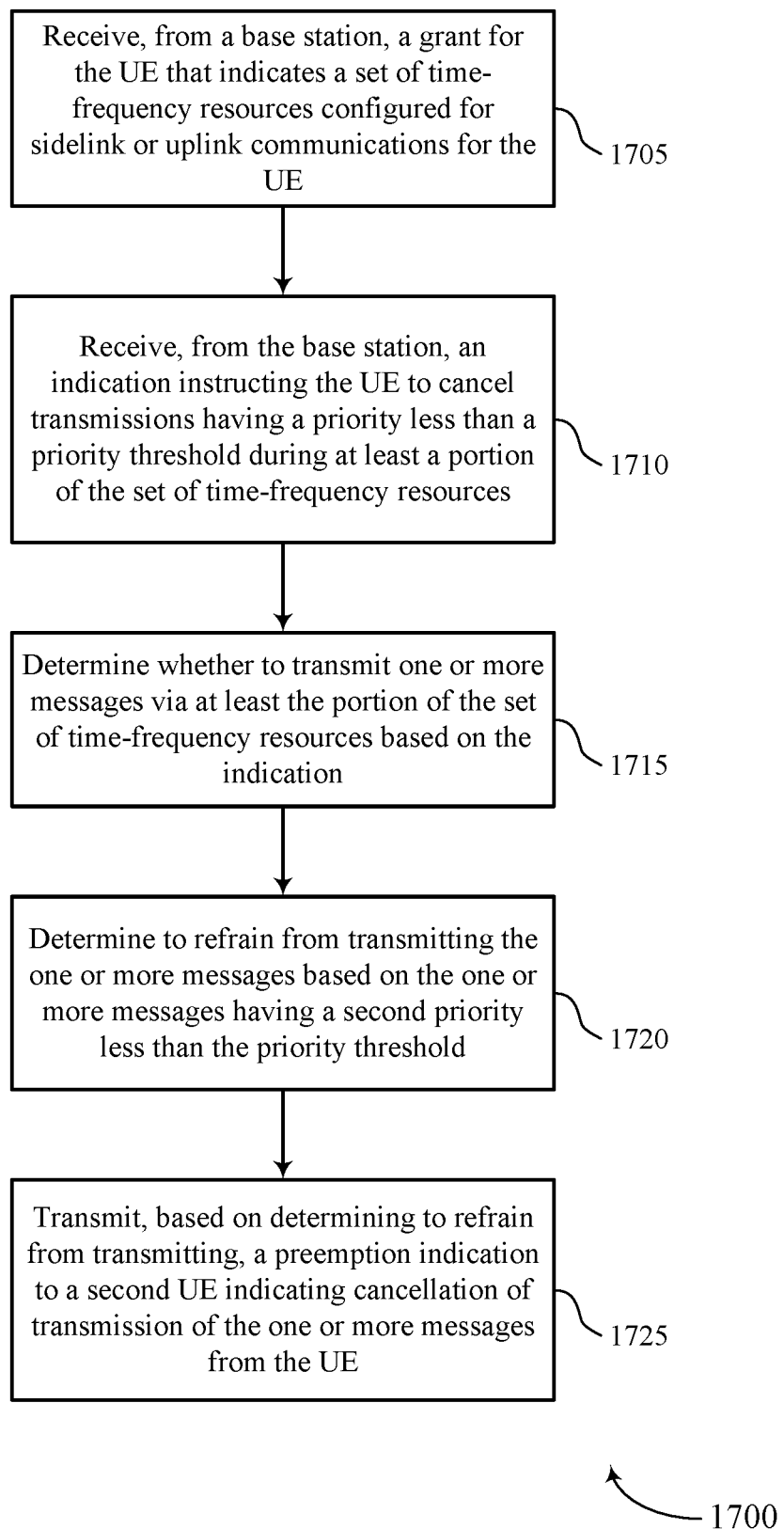

FIG. 17 shows a flowchart illustrating a method 1700 that supports sidelink and uplink prioritized cancellation in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a grant for the UE that indicates a set of time-frequency resources configured for sidelink or uplink communications for the UE. The operations of 1705 may be performed according to the methods described herein. In some examples, aspects of the operations of 1705 may be performed by a grant receiver as described with reference to FIGS. 7 through 10.

At 1710, the UE may receive, from the base station, an indication instructing the UE to cancel transmissions having a priority less than a priority threshold during at least a portion of the set of time-frequency resources. The operations of 1710 may be performed according to the methods described herein. In some examples, aspects of the operations of 1710 may be performed by a cancellation indication receiver as described with reference to FIGS. 7 through 10.

At 1715, the UE may determine whether to transmit one or more messages via at least the portion of the set of time-frequency resources based on the indication. The operations of 1715 may be performed according to the methods described herein. In some examples, aspects of the operations of 1715 may be performed by a communications priority component as described with reference to FIGS. 7 through 10.

At 1720, the UE may determine to refrain from transmitting the one or more messages based on the one or more messages having a second priority less than the priority threshold. The operations of 1720 may be performed according to the methods described herein. In some examples, aspects of the operations of 1720 may be performed by a communications priority component as described with reference to FIGS. 7 through 10.

At 1725, the UE may transmit, based on determining to refrain from transmitting, a preemption indication to a second UE indicating cancellation of transmission of the one or more messages from the UE. The operations of 1725 may be performed according to the methods described herein. In some examples, aspects of the operations of 1725 may be performed by a preemption indication component as described with reference to FIGS. 7 through 10.

Figure 18:
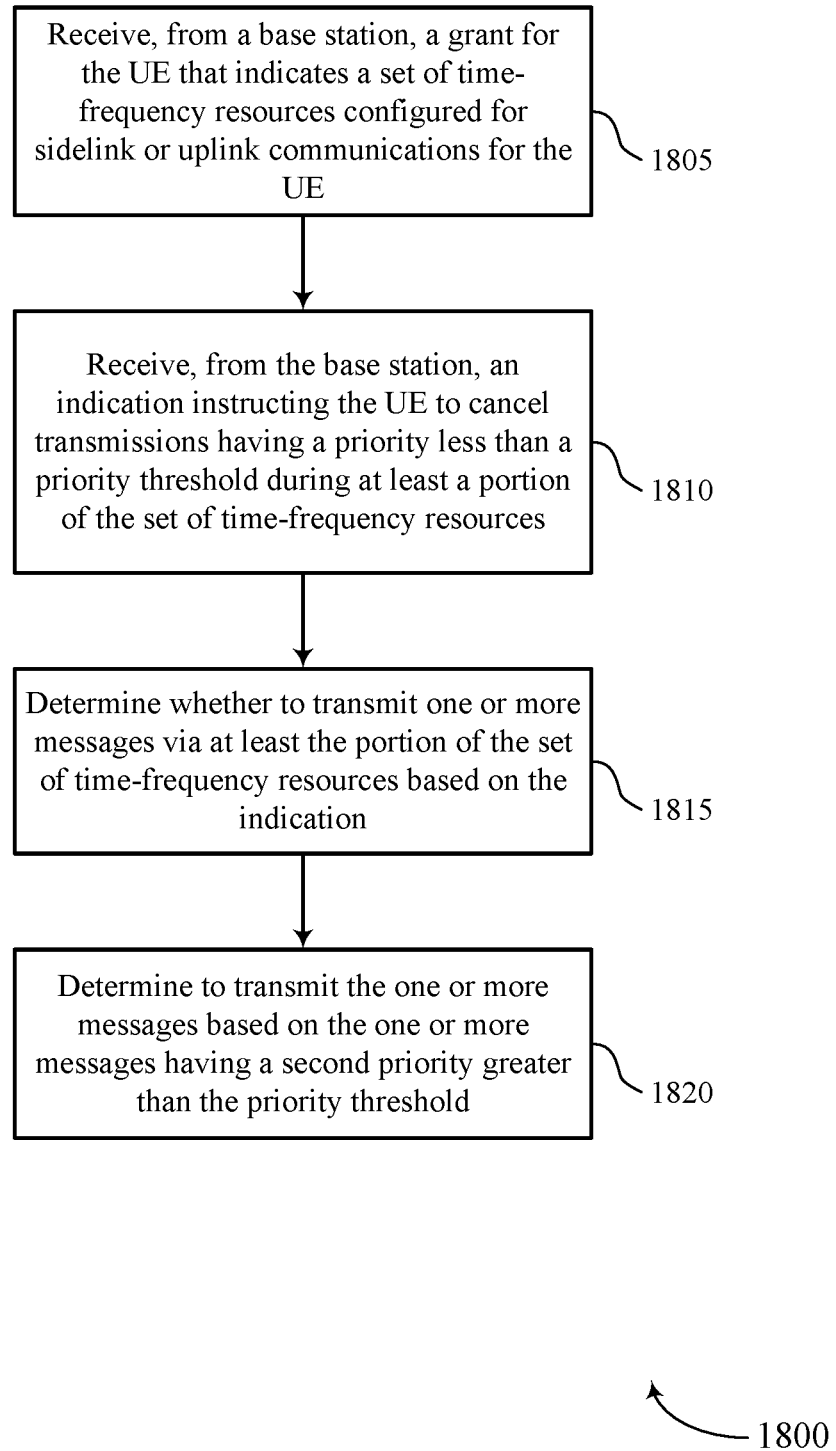

FIG. 18 shows a flowchart illustrating a method 1800 that supports sidelink and uplink prioritized cancellation in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a base station, a grant for the UE that indicates a set of time-frequency resources configured for sidelink or uplink communications for the UE. The operations of 1805 may be performed according to the methods described herein. In some examples, aspects of the operations of 1805 may be performed by a grant receiver as described with reference to FIGS. 7 through 10.

At 1810, the UE may receive, from the base station, an indication instructing the UE to cancel transmissions having a priority less than a priority threshold during at least a portion of the set of time-frequency resources. The operations of 1810 may be performed according to the methods described herein. In some examples, aspects of the operations of 1810 may be performed by a cancellation indication receiver as described with reference to FIGS. 7 through 10.

At 1815, the UE may determine whether to transmit one or more messages via at least the portion of the set of time-frequency resources based on the indication. The operations of 1815 may be performed according to the methods described herein. In some examples, aspects of the operations of 1815 may be performed by a communications priority component as described with reference to FIGS. 7 through 10.

At 1820, the UE may determine to transmit the one or more messages based on the one or more messages having a second priority greater than the priority threshold. The operations of 1820 may be performed according to the methods described herein. In some examples, aspects of the operations of 1820 may be performed by a communications priority component as described with reference to FIGS. 7 through 10.

Figure 19:
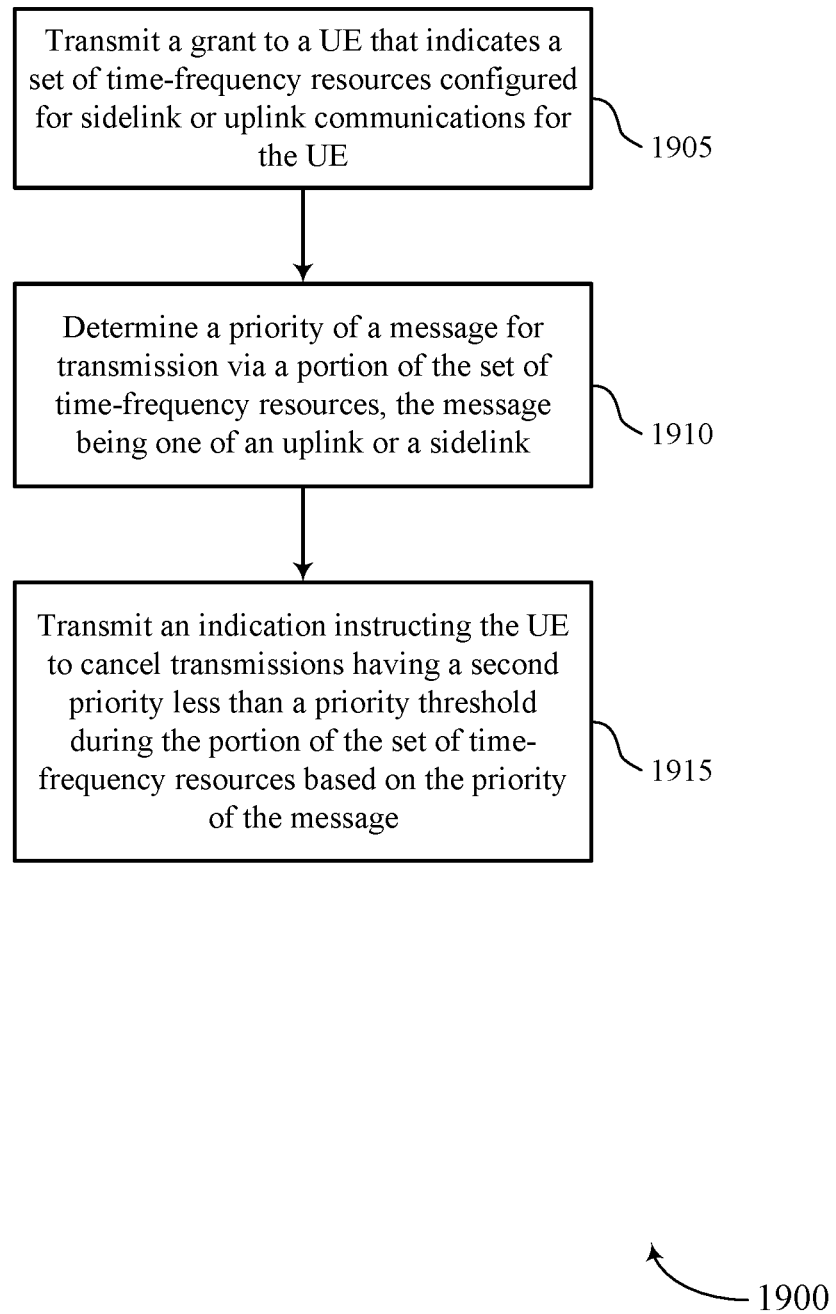

FIG. 19 shows a flowchart illustrating a method 1900 that supports sidelink and uplink prioritized cancellation in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may transmit a grant to a UE that indicates a set of time-frequency resources configured for sidelink or uplink communications for the UE. The operations of 1905 may be performed according to the methods described herein. In some examples, aspects of the operations of 1905 may be performed by a grant transmitter as described with reference to FIGS. 11 through 14.

At 1910, the base station may determine a priority of a message for transmission via a portion of the set of time-frequency resources, the message being one of an uplink or a sidelink. The operations of 1910 may be performed according to the methods described herein. In some examples, aspects of the operations of 1910 may be performed by a cancellation indication transmitter as described with reference to FIGS. 11 through 14.

At 1915, the base station may transmit an indication instructing the UE to cancel transmissions having a second priority less than a priority threshold during the portion of the set of time-frequency resources based on the priority of the message. The operations of 1915 may be performed according to the methods described herein. In some examples, aspects of the operations of 1915 may be performed by a cancellation indication transmitter as described with reference to FIGS. 11 through 14.

Figure 20:
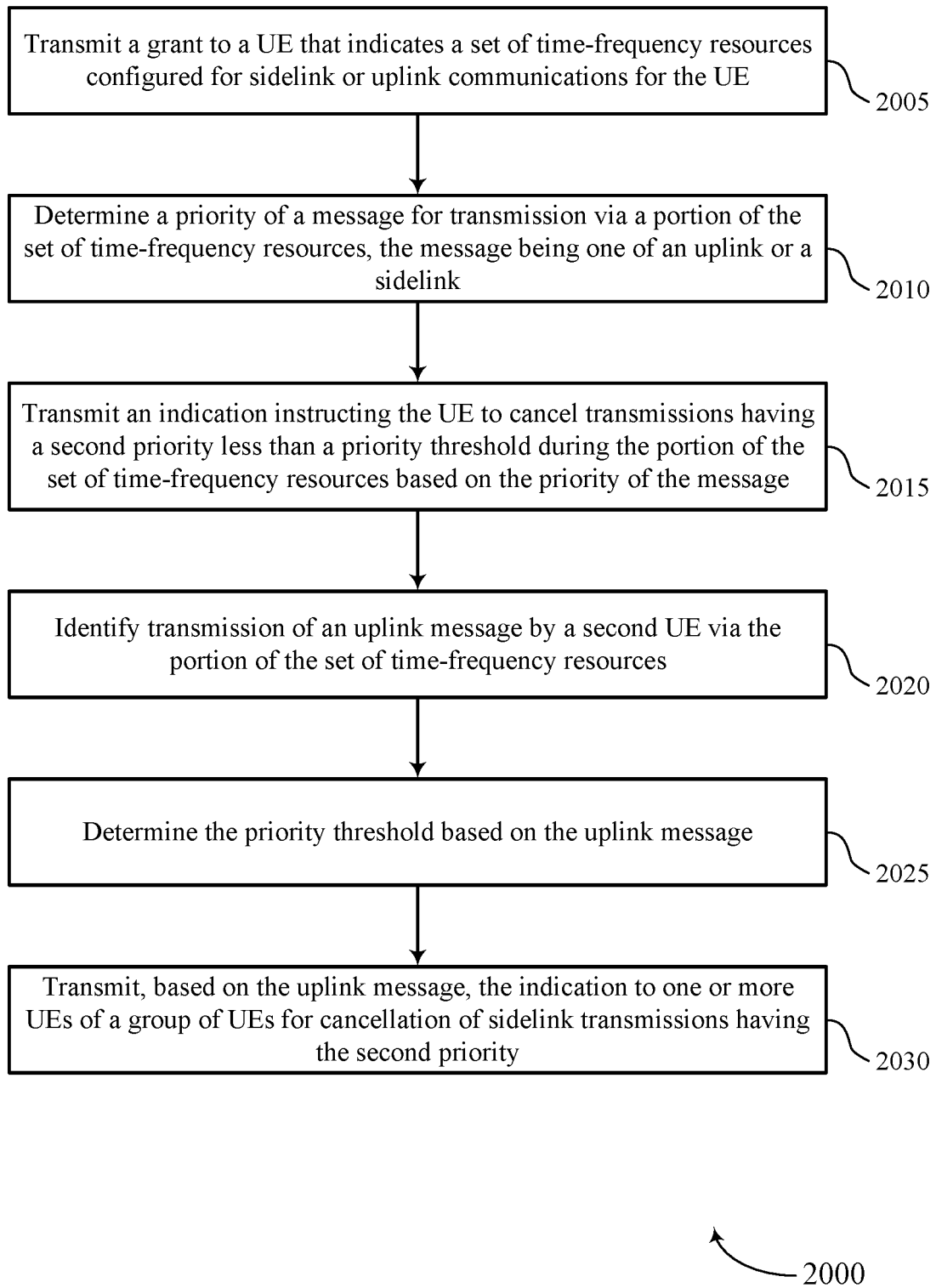

FIG. 20 shows a flowchart illustrating a method 2000 that supports sidelink and uplink prioritized cancellation in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may transmit a grant to a UE that indicates a set of time-frequency resources configured for sidelink or uplink communications for the UE. The operations of 2005 may be performed according to the methods described herein. In some examples, aspects of the operations of 2005 may be performed by a grant transmitter as described with reference to FIGS. 11 through 14.

At 2010, the base station may determine a priority of a message for transmission via a portion of the set of time-frequency resources, the message being one of an uplink or a sidelink. The operations of 2010 may be performed according to the methods described herein. In some examples, aspects of the operations of 2010 may be performed by a cancellation indication transmitter as described with reference to FIGS. 11 through 14.

At 2015, the base station may transmit an indication instructing the UE to cancel transmissions having a second priority less than a priority threshold during the portion of the set of time-frequency resources based on the priority of the message. The operations of 2015 may be performed according to the methods described herein. In some examples, aspects of the operations of 2015 may be performed by a cancellation indication transmitter as described with reference to FIGS. 11 through 14.

At 2020, the base station may identify transmission of an uplink message by a second UE via the portion of the set of time-frequency resources. The operations of 2020 may be performed according to the methods described herein. In some examples, aspects of the operations of 2020 may be performed by an uplink transmission receiver as described with reference to FIGS. 11 through 14.

At 2025, the base station may determine the priority threshold based on the uplink message. The operations of 2025 may be performed according to the methods described herein. In some examples, aspects of the operations of 2025 may be performed by a communications priority component as described with reference to FIGS. 11 through 14.

At 2030, the base station may transmit, based on the uplink message, the indication to one or more UEs of a group of UEs for cancellation of sidelink transmissions having the second priority. The operations of 2030 may be performed according to the methods described herein. In some examples, aspects of the operations of 2030 may be performed by a cancellation indication transmitter as described with reference to FIGS. 11 through 14.

Figure 21:
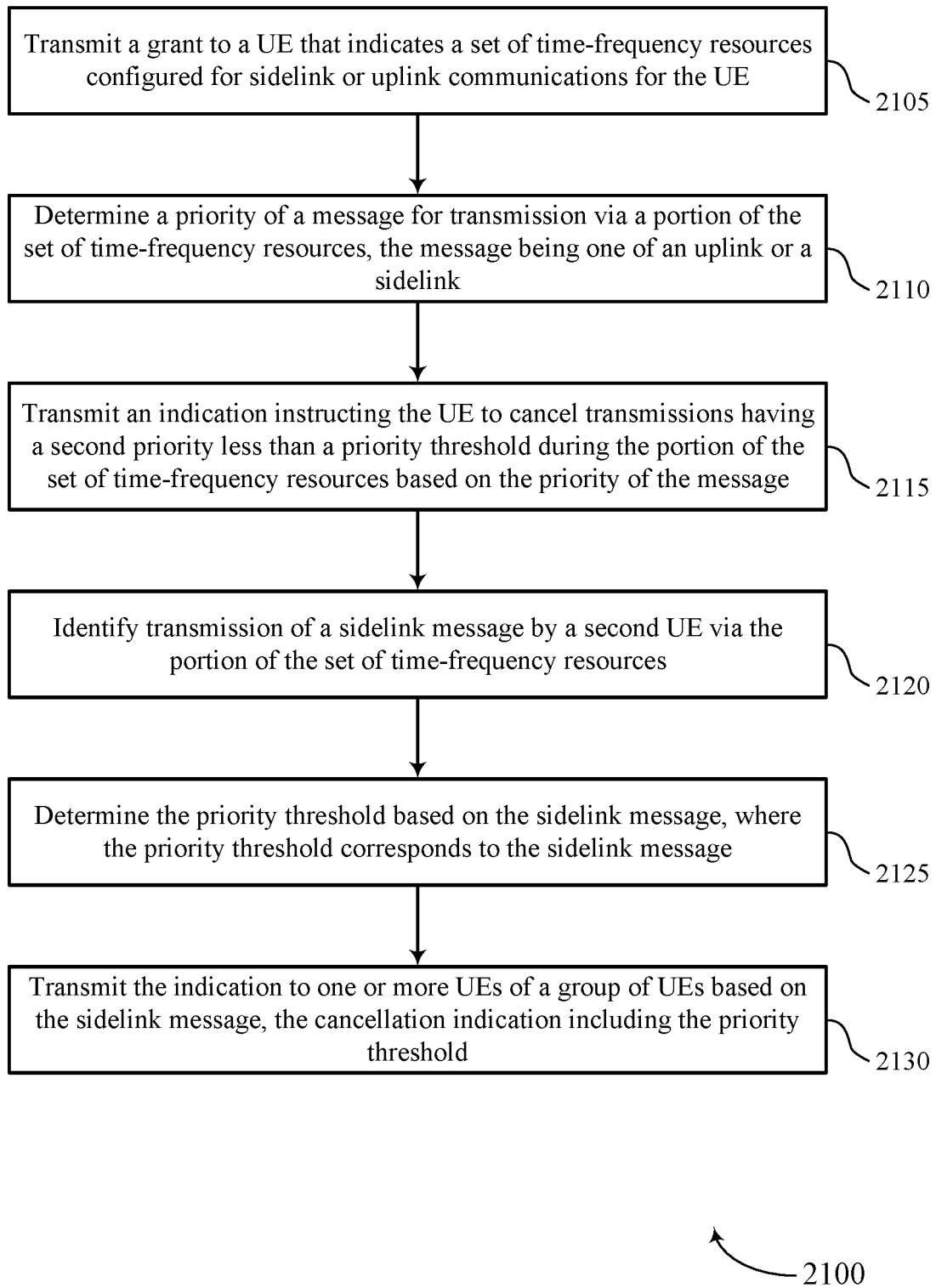

FIG. 21 shows a flowchart illustrating a method 2100 that supports sidelink and uplink prioritized cancellation in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may transmit a grant to a UE that indicates a set of time-frequency resources configured for sidelink or uplink communications for the UE. The operations of 2105 may be performed according to the methods described herein. In some examples, aspects of the operations of 2105 may be performed by a grant transmitter as described with reference to FIGS. 11 through 14.

At 2110, the base station may determine a priority of a message for transmission via a portion of the set of time-frequency resources, the message being one of an uplink or a sidelink. The operations of 2110 may be performed according to the methods described herein. In some examples, aspects of the operations of 2110 may be performed by a cancellation indication transmitter as described with reference to FIGS. 11 through 14.

At 2115, the base station may transmit an indication instructing the UE to cancel transmissions having a second priority less than a priority threshold during the portion of the set of time-frequency resources based on the priority of the message. The operations of 2115 may be performed according to the methods described herein. In some examples, aspects of the operations of 2115 may be performed by a cancellation indication transmitter as described with reference to FIGS. 11 through 14.

At 2120, the base station may identify transmission of a sidelink message by a second UE via the portion of the set of time-frequency resources. The operations of 2120 may be performed according to the methods described herein. In some examples, aspects of the operations of 2120 may be performed by a sidelink identification module as described with reference to FIGS. 11 through 14.

At 2125, the base station may determine the priority threshold based on the sidelink message, where the priority threshold corresponds to the sidelink message. The operations of 2125 may be performed according to the methods described herein. In some examples, aspects of the operations of 2125 may be performed by a communications priority component as described with reference to FIGS. 11 through 14.

At 2130, the base station may transmit the indication to one or more UEs of a group of UEs based on the sidelink message, the cancellation indication including the priority threshold. The operations of 2130 may be performed according to the methods described herein. In some examples, aspects of the operations of 2130 may be performed by a cancellation indication transmitter as described with reference to FIGS. 11 through 14.

The following provides an overview of aspects of the present disclosure:

Aspect 1: A method for wireless communications at a UE, comprising: receiving, from a base station, a grant for the UE that indicates a set of time-frequency resources configured for sidelink or uplink communications for the UE; receiving, from the base station, an indication instructing the UE to cancel transmissions having a priority less than a priority threshold during at least a portion of the set of time-frequency resources; and determining whether to transmit one or more messages via at least the portion of the set of time-frequency resources based at least in part on the indication.

Aspect 2: The method of aspect 1, further comprising: determining to refrain from transmitting the one or more messages based at least in part on the one or more messages having a second priority less than the priority threshold.

Aspect 3: The method of aspect 2, further comprising: transmitting, based at least in part on determining to refrain from transmitting, a preemption indication to a second UE indicating cancellation of transmission of the one or more messages from the UE.

Aspect 4: The method of any of aspects 2 through 3, further comprising: transmitting, to a second UE, an indication of the priority threshold indicating that transmissions having priorities less than the priority threshold are canceled.

Aspect 5: The method of aspect 4, wherein the indication of the priority threshold is included in a preemption indication.

Aspect 6: The method of any of aspects 2 through 5, further comprising: identifying additional resources scheduled for an uplink message from the UE, wherein the additional resources at least partially overlap the set of time-frequency resources indicated by the grant; and refraining from transmitting the uplink message based at least in part on the indication and the uplink message having the second priority.

Aspect 7: The method of any of aspects 1 through 6, further comprising: determining to transmit the one or more messages based at least in part on the one or more messages having a second priority greater than the priority threshold.

Aspect 8: The method of any of aspects 1 through 7, wherein the one or more messages are sidelink messages or uplink messages.

Aspect 9: The method of any of aspects 1 through 8, wherein the set of time-frequency resources of the grant are periodic.

Aspect 10: A method for wireless communications at a base station, comprising: transmitting a grant to a UE that indicates a set of time-frequency resources configured for sidelink or uplink communications for the UE; determining a priority of a message for transmission via a portion of the set of time-frequency resources, the message being one of an uplink or a sidelink; and transmitting an indication instructing the UE to cancel transmissions having a second priority less than a priority threshold during the portion of the set of time-frequency resources based at least in part on the priority of the message.

Aspect 11: The method of aspect 10, further comprising: identifying transmission of an uplink message by a second UE via the portion of the set of time-frequency resources; determining the priority threshold based at least in part on the uplink message; and transmitting, based at least in part on the uplink message, the indication to one or more UEs of a group of UEs for cancellation of sidelink transmissions having the second priority.

Aspect 12: The method of aspect 11, wherein identifying the transmission of the uplink message comprises: receiving a scheduling request for transmission of the uplink message from the second UE.

Aspect 13: The method of any of aspects 11 through 12, wherein the priority threshold corresponds to a priority value of the uplink message.

Aspect 14: The method of any of aspects 10 through 13, further comprising: identifying transmission of a sidelink message by a second UE via the portion of the set of time-frequency resources; determining the priority threshold based at least in part on the sidelink message, wherein the priority threshold corresponds to the sidelink message; and transmitting the indication to one or more UEs of a group of UEs based at least in part on the sidelink message, the indication comprising the priority threshold.

Aspect 15: The method of aspect 14, further comprising: receiving a scheduling request for transmission of the sidelink message from the second UE to a third UE of the group of UEs.

Aspect 16: The method of any of aspects 14 through 15, wherein the priority threshold corresponds to a priority value of the sidelink message.

Aspect 17: The method of any of aspects 10 through 16, wherein the indication comprises the priority threshold.

Aspect 18: The method of any of aspects 10 through 17, wherein the indication comprises an indication of the portion of the set of time-frequency resources.

Aspect 19: The method of any of aspects 10 through 18, wherein the set of time-frequency resources of the grant are periodic.

Aspect 20: An apparatus for wireless communications at a UE, comprising a processor; memory coupled with the processor; and instructions stored in the memory and executable by the processor to cause the apparatus to perform a method of any of aspects 1 through 9.

Aspect 21: An apparatus for wireless communications at a UE, comprising at least one means for performing a method of any of aspects 1 through 9.

Aspect 22: A non-transitory computer-readable medium storing code for wireless communications at a UE, the code comprising instructions executable by a processor to perform a method of any of aspects 1 through 9.

Aspect 23: An apparatus for wireless communications at a base station, comprising a processor; memory coupled with the processor; and instructions stored in the memory and executable by the processor to cause the apparatus to perform a method of any of aspects 10 through 19.

Aspect 24: An apparatus for wireless communications at a base station, comprising at least one means for performing a method of any of aspects 10 through 19.

Aspect 25: A non-transitory computer-readable medium storing code for wireless communications at a base station, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a grant that indicates a set of time-frequency resources configured for sidelink or uplink communications for the UE;
   receiving, from a network device, a priority indication comprising a priority threshold, the priority indication instructing the UE to cancel transmissions having a priority less than the priority threshold for at least a portion of the set of time-frequency resources;
   determining whether to transmit one or more messages via at least the portion of the set of time-frequency resources based at least in part on the priority indication;
   refraining from transmitting the one or more messages based at least in part on the one or more messages having a second priority less than the priority threshold; and
   transmitting a preemption indication to a second UE indicating cancellation of transmission of the one or more messages from the UE.

2. The method of claim 1, further comprising:
   transmitting, to the second UE, an indication of the priority threshold indicating that one or more transmissions having priorities less than the priority threshold are canceled.

3. The method of claim 2, wherein the indication of the priority threshold is included in the preemption indication.

4. The method of claim 1, further comprising:
   identifying additional resources scheduled for an uplink message from the UE, wherein the additional resources at least partially overlap the set of time-frequency resources indicated by the grant; and
   refraining from transmitting the uplink message based at least in part on the priority indication and the uplink message having the second priority.

5. The method of claim 1, further comprising:
   transmitting the one or more messages based at least in part on the one or more messages having a second priority greater than the priority threshold.

6. The method of claim 1, wherein the one or more messages are sidelink messages or uplink messages.

7. The method of claim 1, wherein the set of time-frequency resources of the grant are periodic.

8. A method for wireless communications at a network device, comprising:
   transmitting a grant that indicates a set of time-frequency resources configured for sidelink or uplink communications for a user equipment (UE);
   determining a priority of a message for transmission via a portion of the set of time-frequency resources, the message being one of an uplink or a sidelink;
   transmitting, to the UE, a priority indication comprising a priority threshold, the priority indication instructing the UE to cancel transmissions having a second priority less than the priority threshold for the portion of the set of time-frequency resources based at least in part on the priority of the message;
   identifying a transmission of an uplink or sidelink message by a second UE via the portion of the set of time-frequency resources; and
   determining the priority threshold based at least in part on the uplink or sidelink message.

9. The method of claim 8, wherein:
the identifying the transmission of the uplink or sidelink message by the second UE comprises identifying a transmission of the uplink message by the second UE via the portion of the set of time-frequency resources; and
the priority threshold is determined based at least in part on the uplink message; the method further comprising:
transmitting, based at least in part on the uplink message, the priority indication to one or more UEs of a group of UEs for cancellation of sidelink transmissions having the second priority.

10. The method of claim 9, wherein identifying the transmission of the uplink message comprises:
receiving a scheduling request for the transmission of the uplink message from the second UE.

11. The method of claim 9, wherein the priority threshold corresponds to a priority value of the uplink message.

12. The method of claim 8, further comprising:
identifying a transmission of the sidelink message by the second UE via the portion of the set of time-frequency resources;
determining the priority threshold based at least in part on the sidelink message, wherein the priority threshold corresponds to the sidelink message; and
transmitting the priority indication to one or more UEs of a group of UEs based at least in part on the sidelink message, the priority indication comprising the priority threshold.

13. The method of claim 12, further comprising:
receiving a scheduling request for the transmission of the sidelink message from the second UE to a third UE of the group of UEs.

14. The method of claim 12, wherein the priority threshold corresponds to a priority value of the sidelink message.

15. The method of claim 8, wherein the priority indication comprises an indication of the portion of the set of time-frequency resources.

16. The method of claim 8, wherein the set of time-frequency resources of the grant are periodic.

17. An apparatus for wireless communications at a user equipment (UE), comprising:
a processor; and
a memory coupled to the processor, the memory comprising instructions executable by the processor to cause the apparatus to:
receive a grant that indicates a set of time-frequency resources configured for sidelink or uplink communications for the UE;
receive, from a network device, a priority indication comprising a priority threshold, the priority indication instructing the UE to cancel transmissions having a priority less than the priority threshold for at least a portion of the set of time-frequency resources;
determine whether to transmit one or more messages via at least the portion of the set of time-frequency resources based at least in part on the priority indication;
refrain from transmitting the one or more messages based at least in part on the one or more messages having a second priority less than the priority threshold; and
transmit a preemption indication to a second UE indicating cancellation of transmission of the one or more messages from the UE.

18. The apparatus of claim 17, wherein the instructions are further executable by the processor to cause the apparatus to:
transmit, to a second UE, an indication of the priority threshold indicating that one or more transmissions having priorities less than the priority threshold are canceled.

19. The apparatus of claim 18, wherein the indication of the priority threshold is included in a preemption indication.

20. The apparatus of claim 17, wherein the instructions are further executable by the processor to cause the apparatus to:
identify additional resources scheduled for an uplink message from the UE, wherein the additional resources at least partially overlap the set of time-frequency resources indicated by the grant; and
refrain from transmitting the uplink message based at least in part on the priority indication and the uplink message having the second priority.

21. The apparatus of claim 17, wherein the instructions are further executable by the processor to cause the apparatus to:
transmit the one or more messages based at least in part on the one or more messages having a second priority greater than the priority threshold.

22. The apparatus of claim 17, wherein the one or more messages are sidelink messages or uplink messages.

23. The apparatus of claim 17, wherein the set of time-frequency resources of the grant are periodic.

24. An apparatus for wireless communications at a network device, comprising:
a processor; and
a memory coupled to the processor, the memory comprising instructions executable by the processor to cause the apparatus to:
transmit a grant that indicates a set of time-frequency resources configured for sidelink or uplink communications for a user equipment (UE);
determine a priority of a message for transmission via a portion of the set of time-frequency resources, the message being one of an uplink or a sidelink;
transmit, to the UE, a priority indication comprising a priority threshold, the priority indication instructing the UE to cancel transmissions having a second priority less than the priority threshold for the portion of the set of time-frequency resources based at least in part on the priority of the message;
identify a transmission of an uplink message by a second UE via the portion of the set of time-frequency resources and;
determine the priority threshold based at least in part on the uplink message.

25. The apparatus of claim 24, wherein the instructions are further executable by the processor to cause the apparatus to:
transmit, based at least in part on the uplink message, the priority indication to one or more UEs of a group of UEs for cancellation of sidelink transmissions having the second priority.

* * * * *